US011919253B2

(12) United States Patent
Huang et al.

(10) Patent No.: US 11,919,253 B2
(45) Date of Patent: Mar. 5, 2024

(54) WELDING ASSEMBLY AND METHOD USING SEPARATELY ACTUATABLE RAMS

(71) Applicant: ROHR, INC., Chula Vista, CA (US)

(72) Inventors: Jonathan S. Huang, Pasadena, CA (US); Michael van Tooren, San Diego, CA (US); Dominic J Elliott, Riverside, CA (US); Jeffrey D. Woods, Beaumont, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/870,088

(22) Filed: Jul. 21, 2022

(65) Prior Publication Data

US 2024/0025129 A1   Jan. 25, 2024

(51) Int. Cl.
*B29C 65/00* (2006.01)
*B29C 65/02* (2006.01)
*B29C 65/32* (2006.01)
*B29C 65/46* (2006.01)

(52) U.S. Cl.
CPC ...... *B29C 66/8242* (2013.01); *B29C 66/1122* (2013.01); *B29C 66/41* (2013.01); *B29C 65/02* (2013.01); *B29C 65/32* (2013.01); *B29C 65/46* (2013.01)

(58) Field of Classification Search
CPC .......... B29C 65/02; B29C 65/32; B29C 65/46
See application file for complete search history.

(56) References Cited

U.S. PATENT DOCUMENTS

| 3,533,865 | A | 10/1970 | Bocquet et al. |
| 4,758,293 | A * | 7/1988 | Samida ............... B29C 66/8226 156/568 |
| 5,225,025 | A | 7/1993 | Lambing et al. |
| 6,368,437 | B1 * | 4/2002 | Ziegelhoffer ..... B29C 66/83517 156/580.2 |
| 9,333,705 | B1 * | 5/2016 | Fujita ................ B29C 66/81431 |
| 11,351,737 | B2 * | 6/2022 | Lohoff ................. B23K 20/106 |
| 2015/0360414 | A1 * | 12/2015 | Li ....................... B29C 66/9592 156/539 |
| 2022/0005616 | A1 * | 1/2022 | Mastopietro ......... G21C 13/067 |

FOREIGN PATENT DOCUMENTS

CA     2324141     4/2002

OTHER PUBLICATIONS

U.S. Appl. No. 17/341,216, filed Jun. 7, 2021 and entitled "Fixtures and Methods for Induction Welding", 40 pages.

* cited by examiner

*Primary Examiner* — Philip C Tucker
*Assistant Examiner* — Nickolas R Harm
(74) *Attorney, Agent, or Firm* — SNELL & WILMER L.L.P.

(57) ABSTRACT

A welding assembly is disclosed. The welding assembly includes a plurality of separately controllable actuators (e.g., pneumatic, having an axially movable ram) to press a corresponding portion of a first workpiece (e.g., a discrete flange of a first stiffener) against a second workpiece (e.g., an outer skin) for welding operations (e.g., via induction welding).

12 Claims, 26 Drawing Sheets

WELDING ASSEMBLY AND METHOD USING SEPARATELY ACTUATABLE RAMS

BACKGROUND

1. Technical Field

This disclosure relates generally to welding and, more particularly, to welding a workpiece having non-continuous sections (e.g., a stiffener with a plurality of spaced flanges) to another workpiece (e.g., an outer skin).

2. Background Information

A workpiece may be induction welded to bond workpiece members of the workpiece together. Induction welding requires enhanced temperature control to prevent the top surface of the workpiece from burning, while maintaining a melting temperature at the bond line between an adjacent pair of workpiece members.

SUMMARY

A welding assembly (e.g., an induction welding assembly) is presented herein. Both the configuration of such a welding assembly and the operation of such a welding assembly are within the scope of this Summary.

A first aspect is embodied by a welding assembly that includes a first support, a tooling block that is spaced at least in part from the first support, a plurality of rams or workpiece retention rams, a workpiece zone that is disposed/located between the first support and the tooling block, and a welding head (e.g., an induction welding coil). The workpiece retention rams are incorporated by the tooling block and are spaced from one another proceeding along a first dimension (e.g., a circumferential dimension). Each workpiece retention ram is movable (e.g., along an axial path) in a direction of the workpiece zone and the first support. The welding head is also movable relative to the first support (e.g., in a circumferential dimension) and separately into alignment with each workpiece retention ram for a separate welding operation. That is, the welding head may be aligned with a particular workpiece retention ram for one welding operation, and may be moved relative to the first support into alignment with a different workpiece retention ram for another welding operation.

Another aspect is embodied by a method of assembling a panel (e.g., a panel for an aircraft fuselage; a panel for an aircraft nacelle). A plurality of flanges of a first stiffener are positioned at least in proximity to an outer skin (e.g., one or more of the flanges could be in contact with the outer skin). The plurality of flanges are spaced from one another proceeding along a length dimension of the first stiffener. Each flange of the first stiffener is aligned with a different ram. A welding head is positioned in alignment with a first flange of the first stiffener. A first ram is actuated to press the first flange against the outer skin (e.g., against an interior surface of the outer skin). The welding head is operated to weld the first flange to the outer skin while the first flange is being pressed against the outer skin by the first ram.

The welding assembly/welding operations addressed herein may be in the form of induction welding, where one thermoplastic composite workpiece (e.g., an outer skin) is induction welded to another thermoplastic composite workpiece (e.g., a stiffener having a plurality of flanges that are spaced along its length dimension, where each flange may be separately welded to the noted outer skin). The welding/welding operations addressed herein can be used to weld one curved workpiece to another curved workpiece (or corresponding curved portions of these two different workpieces), and can also be used to weld corresponding flat portions of two different workpieces (including where a primary surface of at least one of the workpieces is entirely flat).

Various aspects of the present disclosure are also addressed by the following examples and in the noted combinations:

1. A welding assembly, comprising:
   a first support;
   a tooling block spaced from said first support;
   a plurality of workpiece retention rams incorporated by said tooling block and that are spaced from one another proceeding along a first dimension;
   a workpiece zone disposed between said first support and said tooling block; and
   a welding head, wherein said workpiece zone is disposed between said welding head and said tooling block, wherein each workpiece retention ram of said plurality of workpiece retention rams is movable in a direction of said workpiece zone and said first support, and wherein said welding head is movable relative to first support and separately into alignment with each said workpiece retention ram of said plurality of workpiece retention rams for a separate welding operation.

2. The welding assembly of example 1, wherein said welding head is configured for induction welding.

3. The welding assembly of any of examples 1-2, wherein said welding head comprises an induction welding coil.

4. The welding assembly of any of examples 1-3, wherein for each said welding operation said welding head is aligned with only one of said plurality of workpiece retention rams.

5. The welding assembly of example 4, wherein only one of said plurality of workpiece retention rams is actuated for each said welding operation and a remainder of said plurality of workpiece retention rams remain un-actuated, and wherein said one of said plurality of workpiece retention rams is said workpiece retention ram is that aligned with said welding head.

6. The welding assembly of any of examples 1-5, further comprising:
   a first configuration where a first workpiece retention ram of said plurality of workpiece retention rams is configured to exert a force along a first axis that is aligned with said welding head when in a first position relative to said first support; and
   a second configuration where a second workpiece retention ram of said plurality of workpiece retention rams is configured to exert a force along a second axis that is aligned with said welding head when in a second position relative to said first support, wherein said first workpiece retention ram is spaced from said second workpiece retention ram proceeding along said first dimension, and wherein said first position of said welding head is also spaced from said second position of said welding head proceeding along said first dimension.

7. The welding assembly of any of examples 1-6, further comprising:
   a plurality of actuators, wherein each actuator of said plurality of actuators comprises a different one of said plurality of workpiece retention rams.

8. The welding assembly of example 7, wherein each said actuator is selected from the group consisting essentially of a pneumatic actuator, and a hydraulic actuator.

9. The welding assembly of any of examples 1-8, wherein said plurality of workpiece retention rams are equally spaced from one another proceeding along said first dimension.

10. The welding assembly of any of examples 1-9, wherein said tooling block comprises a plurality of receptacles that are spaced from one another proceeding along said first dimension, wherein at least an end portion of each of said plurality of workpiece retention rams is disposed in a different one of said plurality of receptacles.

11. The welding assembly of any of examples 1-10, wherein said workpiece zone comprises:
an outer skin; and
a first stiffener comprising a plurality of flanges that are spaced from one another proceeding along said first dimension, wherein a length dimension of said first stiffener extends in said first dimension.

12. The welding assembly of example 11, wherein each of said plurality of flanges of said first stiffener is aligned with a different one of said plurality of workpiece retention rams.

13. The welding assembly of example 12, wherein each of said plurality of workpiece retention rams compresses its corresponding said flange against said outer skin for a corresponding said welding operation using said welding head.

14. The welding assembly of any of examples 11-13, wherein said first stiffener comprises a plurality of pockets that are spaced along said length dimension of said first stiffener, said welding assembly further comprising a plurality of second stiffeners that are attached to said outer skin, and wherein each of said plurality of pockets of said first stiffener receives a different one of said plurality of second stiffeners and with each second stiffener extending through said first stiffener.

15. The welding assembly of example 14, wherein a length dimension of each of said plurality of second stiffeners is orthogonal to said length dimension of said first stiffener.

16. The welding assembly of example 15, wherein said length dimension of said plurality of second stiffeners corresponds with a length dimension of said outer skin.

17. The welding assembly of any of examples 11-16, wherein said outer skin is selected from the group consisting of an aircraft fuselage panel and a nacelle panel.

18. The welding assembly of any of examples 11-17, wherein said first stiffener is curved proceeding along said length dimension of said first stiffener and with said length dimension of said first stiffener proceeding in said first dimension.

19. The welding assembly of any of examples 1-18, wherein said first dimension is a circumferential dimension and with said plurality of workpiece retention rams being spaced from one another proceed along an arc within said first dimension.

20. A method of assembling a panel, comprising:
positioning a plurality of flanges of a first stiffener at least in proximity to an outer skin, wherein said plurality of flanges are spaced proceeding along a length dimension of said first stiffener, and wherein each flange of said plurality of flanges is aligned with a different ram of a plurality of rams;
positioning a welding head in alignment with a first flange of said plurality of flanges;
actuating a first ram of said plurality of rams to press said first flange against said outer skin; and
operating said welding head to weld said first flange to said outer skin while said first flange is pressed against said outer skin by said first ram.

21. The method of example 20, wherein said first stiffener is curved in said length dimension of said first stiffener.

22. The method of any of examples 20-21, wherein said outer skin is curved in a circumferential dimension, and wherein said length dimension of said first stiffener extends in said circumferential dimension.

23. The method of any of examples 20-22, wherein said actuating a first ram step comprises pneumatically actuating said first ram.

24. The method of any of examples 20-22, wherein said actuating a first ram step comprises hydraulically actuating said first ram.

25. The method of any of examples 20-24, wherein said first ram exerts a first force along a first axis that intersects said first flange from said actuating a first ram step.

26. The method of example 25, wherein said welding head is in a first position when welding said first flange to said outer skin, and wherein said first axis is aligned with said welding head when in said first position.

27. The method of any of examples 20-26, wherein said operating said welding head to weld said first flange to said outer skin comprises induction welding said first flange to said outer skin.

28. The method of any of examples 20-27, wherein a plurality of second stiffeners are attached to said outer skin prior to said positioning step for said first stiffener, wherein said first stiffener comprises a plurality pockets that are spaced from one another proceeding along said length dimension of said first stiffener, and wherein said positioning step for said first stiffener comprises disposing a different one of said plurality of second stiffeners in each of said plurality of pockets of said first stiffener.

29. The method of example 28, wherein said positioning step for said first stiffener comprises disposing said length dimension of said first stiffener orthogonal to a length dimension of said plurality of second stiffeners.

30. The method of any of examples 28-29, wherein each said flange of said plurality of flanges is disposed between a different adjacent pair of said plurality of second stiffeners.

31. The method of any of examples 20-30, further comprising:
moving said welding head into alignment with a second flange of said plurality of flanges after welding said first flange to said outer skin;
actuating a second ram of said plurality of rams to press said second flange against said outer skin; and
operating said welding head to weld said second flange to said outer skin while said second flange is pressed against said outer skin by said second ram.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

DETAILED DESCRIPTION

Figure 1:
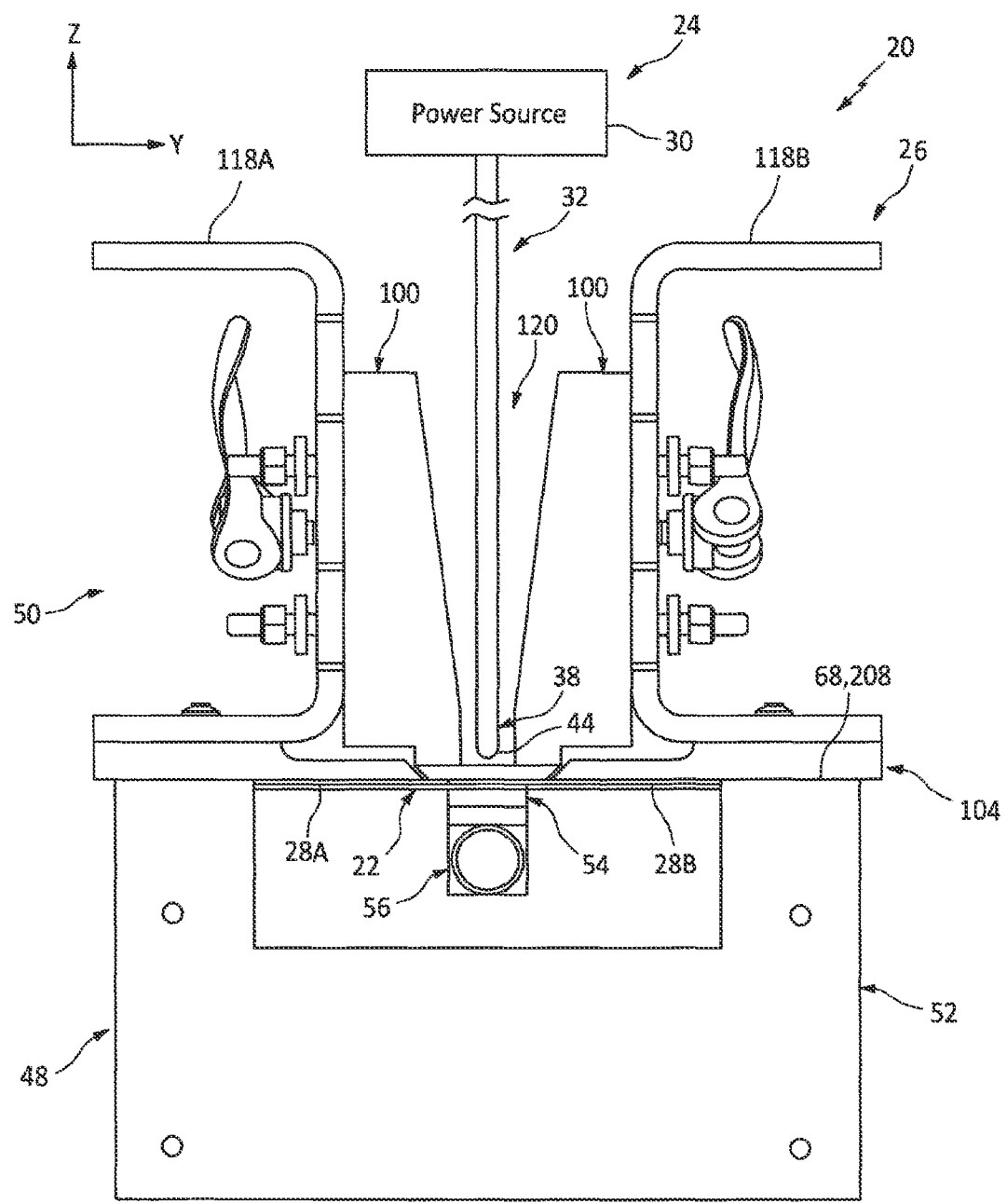
FIG. 1 is a side illustration of a portion of a system for induction welding a workpiece.

FIG. 1 illustrates a system 20 for induction welding a workpiece 22. This induction welding system 20 includes an induction welder 24 and an induction welding fixture 26.

The induction welder 24 is configured to induction weld the workpiece 22. More particularly, the induction welder 24 is configured to induction weld two or more members 28A and 28B (generally referred to as "28") of the workpiece 22 together, which workpiece members 28 may be (e.g., discretely formed) thermoplastic bodies or any other type of induction weldable bodies. The induction welder 24 of FIG. 1 includes a power source 30 and an induction coil assembly 32.

The power source 30 is configured to generate a periodic electrical current. The power source 30, for example, may be configured as a high-frequency current source. The power source 30 may be or otherwise include an alternating current (AC) generator, transformer, amplifier, etc. Alternatively, the power source 30 may include a direct current (DC) generator, transformer, amplifier, battery, etc. electrically coupled with an oscillator. The present disclosure, however, is not limited to such exemplary power sources.

Figure 2:
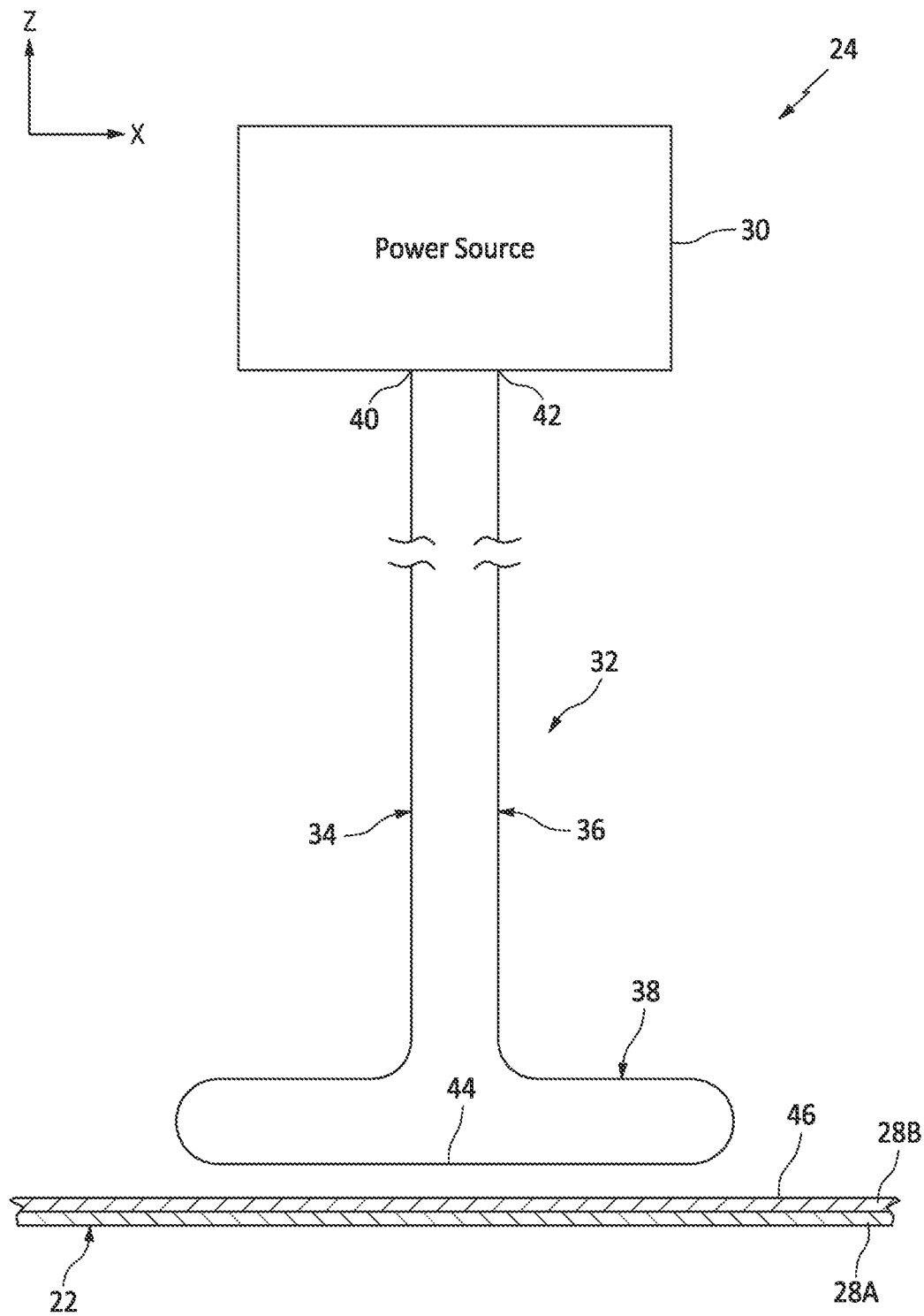
FIG. 2 is a schematic illustration of an induction welder arranged with the workpiece.

Referring to FIG. 2, the induction coil assembly 32 includes an electrical first lead 34, an electrical second lead 36 and an induction welding coil 38. The first lead 34 may be arranged parallel with the second lead 36. The first lead 34 and the second lead 36 are connected to opposing ends of the induction welding coil 38. The first lead 34 and the second lead 36 electrically couple the induction welding coil 38 to respective terminals 40 and 42 of the power source 30.

The induction welding coil 38 may be configured as an elongated loop. The induction welding coil 38 of FIG. 2, for example, extends along a non-straight (e.g., generally racetrack shaped) centerline between and to the coil ends. The induction welding coil 38 of FIG. 2 includes at least one welding (e.g., bottom side) segment 44. This welding segment 44 may be configured to substantially match an exterior surface contour of the workpiece 22 to be induction welded. The welding segment 44, for example, may be straight where the workpiece 22 has a flat exterior surface 46. The welding segment 44 may alternatively be non-straight (e.g., curved, compound, etc.) where the workpiece exterior surface 46 is a non-straight; e.g., curved, compound, etc. The present disclosure, however, is not limited to the foregoing exemplary induction welding coil configurations.

Referring to FIG. 1, the induction welding fixture 26 is configured to position and secure (e.g., temporarily, fixedly hold) the workpiece 22 during induction welding. More particularly, the induction welding fixture 26 is configured to position and secure the workpiece members 28 together while those members 28 are induction welded together using the induction welding coil 38.

The induction welding fixture 26 of FIG. 1 includes a first (e.g., bottom, base) support structure 48 and a second (e.g., top, lid) support structure 50. For ease of description, the first support structure 48 is referred to below as a "bottom support structure" and the second support structure 50 is referred to below as a "top support structure". However, the present disclosure is not limited to such an exemplary orientation relative to gravity. For example, in other embodiments, the support structure 50 may be arranged vertically below, or to a side of, the support structure 48.

Figure 3:
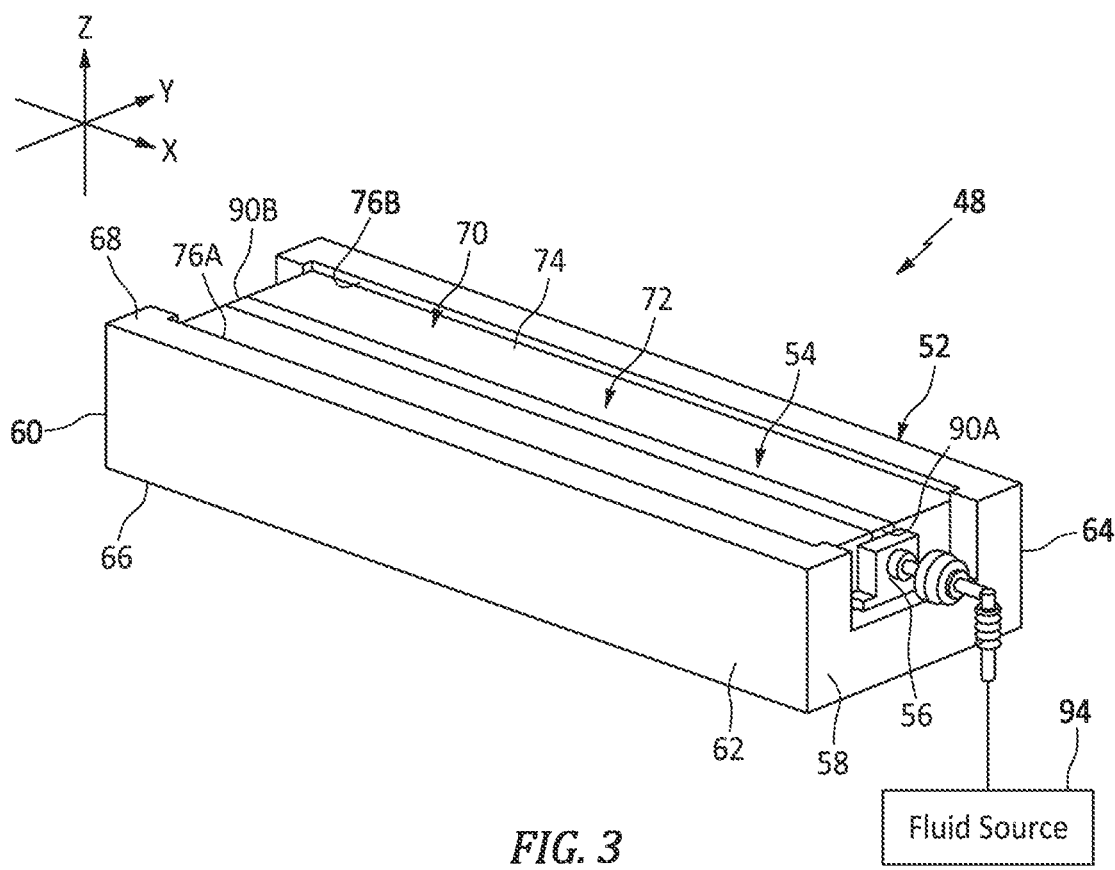
FIG. 3 is a perspective illustration of a bottom support structure.

Referring to FIG. 3, the bottom support structure 48 includes a support structure base 52, a bottom heat management device 54 (e.g., a heat sink or an insulator) and an actuator 56. The support structure base 52 extends longitudinally (e.g., along an x-axis) between and to a first end 58 of the support structure base 52 and a second end 60 of the support structure base 52. The support structure base 52 extends laterally (e.g., along a y-axis) between and to a first side 62 of the support structure base 52 and a second side 64 of the support structure base 52. The support structure base 52 extends vertically (e.g., along a z-axis) between and to a bottom side 66 of the support structure base 52 and a top side 68 of the support structure base 52.

Figure 4:
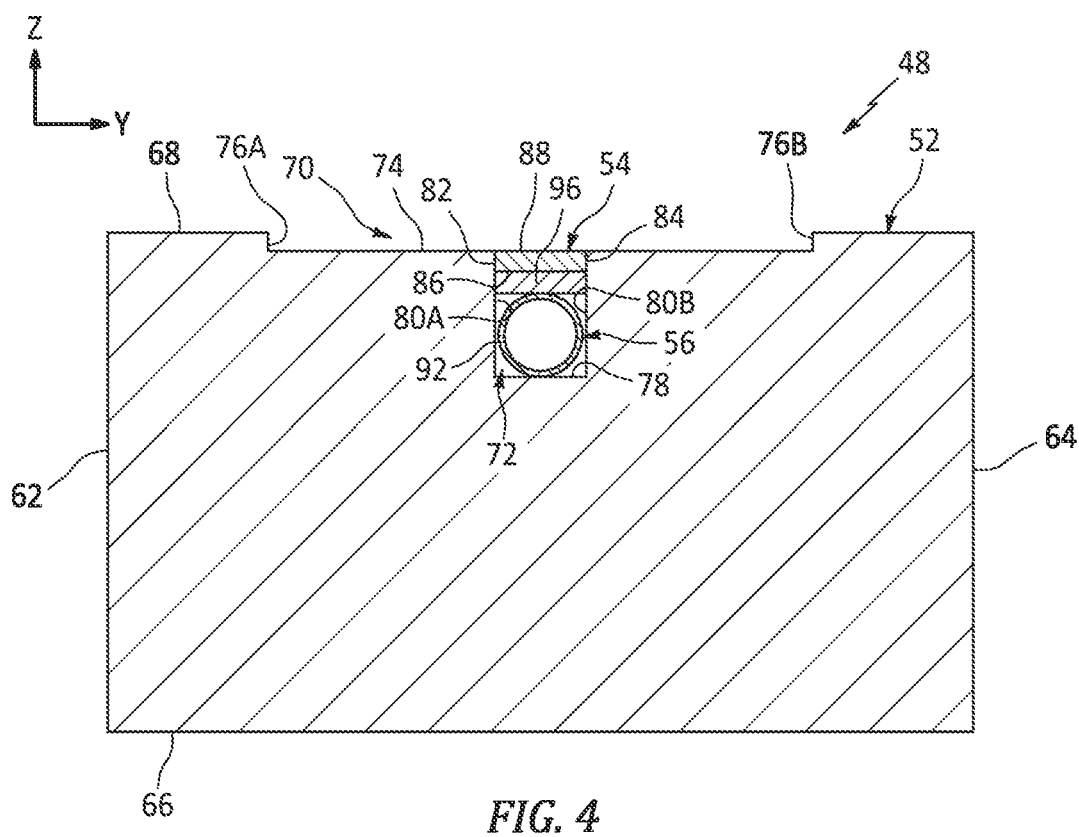
FIG. 4 is a cross-sectional illustration of the bottom support structure.

Referring to FIG. 4, the support structure base 52 is configured with a receptacle 70 adapted to receive the workpiece 22 (see FIG. 1). The support structure base 52 is also configured with a channel 72 configured to receive the bottom heat management device 54 and the actuator 56.

The workpiece receptacle 70 may be configured as a channel or a depression in the base top side 68. The workpiece receptacle 70 of FIG. 4, for example, is located at (e.g., on, adjacent or proximate) the base top side 68, and intermediate (e.g., midway) laterally between the opposing base sides 62 and 64. The workpiece receptacle 70 extends vertically into the support structure base 52 from the base top side 68 to a receptacle end surface 74 of the support structure base 52. The workpiece receptacle 70 extends laterally within the support structure base 52 between and to opposing receptacle side surfaces 76A and 76B (generally referred to as "76") of the support structure base 52. The workpiece receptacle 70 extends longitudinally through (or within) the support structure base 52 between and to or about the opposing base ends 58 and 60 (see FIG. 3).

The base channel 72 is also located at (e.g., on, adjacent or proximate) the base top side 68, and intermediate (e.g., midway) laterally between the opposing base sides 62 and 64 and the opposing receptacle side surfaces 76. The base channel 72 of FIG. 4, for example, extends vertically into the support structure base 52 from the receptacle end surface 74 to a channel end surface 78 of the support structure base 52. The base channel 72 extends laterally within the support structure base 52 between and to opposing channel sides surfaces 80A and 80B (generally referred to as "80") of the support structure base 52. The base channel 72 extends longitudinally through (or within) the support structure base 52 between and to or about the opposing base ends 58 and 60 (see FIG. 3). The support structure base 52 of the present disclosure, however, is not limited to such an exemplary channel configuration. For example, in other embodiments, the base channel 72 may extends vertically into the support structure base 52 from the base top side 68 where, for example, the workpiece receptacle 70 is omitted.

The support structure base 52 may be constructed from a non-electrically conductive material. This non-electrically conductive material may be a polymer such as, but not limited to, polyurethane. The present disclosure, however, is not limited to the foregoing exemplary support structure base materials.

The bottom heat management device 54 may be or otherwise include a heat sink configured to absorb heat energy. The bottom heat management device 54, for example, may be constructed from a ceramic such as, but not limited to, aluminum silicate (also referred to as alumina silicate). The present disclosure, however, is not limited to the foregoing exemplary first heat sink materials. Furthermore, in other embodiments, the bottom heat management device 54 may be or otherwise include an insulator. The heat management device 54, for example, may be configured to absorb and/or block transfer of heat energy.

The bottom heat management device 54 of FIG. 4 extends laterally between and to a first side 82 of the bottom heat management device 54 and a second side 84 of the bottom heat management device 54. The bottom heat management device 54 extends vertically between and to a bottom side 86 of the bottom heat management device 54 and a top side 88 of the bottom heat management device 54. Referring to FIG. 3, the bottom heat management device 54 extends longitudinally between and to opposing ends 90A and 90B (generally referred to as "90") of the bottom heat management device 54).

The bottom heat management device 54 of FIG. 4 is mated with (e.g., received within) the base channel 72. The heat management device first side 82 is abutted laterally against and moveable (e.g., slidable) along the channel first side surface 80A. The heat management device second side 84 is abutted laterally against and moveable (e.g., slidable) along the channel second side surface 80B. The heat management device bottom side 86 faces the channel end surface 78. The heat management device top side 88 faces away from the support structure base 52; e.g., in a vertical upwards direction.

The actuator 56 is mated with (e.g., received within) the base channel 72, and arranged vertically between the channel end surface 78 and the bottom heat management device 54. The actuator 56 is configured to push (e.g., bias) the bottom heat management device 54 vertically away from the support structure base 52 and its channel end surface 78. The actuator 56 of FIG. 4, for example, is configured as an expandable pressure vessel 92; e.g., fluid bladder such as, but not limited to, an expandable air tube, an expandable air bag, etc. This pressure vessel 92 is connected to a fluid source 94; e.g., a compressed air reservoir (e.g., a tank) and/or an air pump. The pressure vessel 92 is configured to receive fluid (e.g., compressed air) from the fluid source 94, where regulation of the fluid may cause the pressure vessel 92 to expand or contract in size. When the pressure vessel 92 expands in size, the fixed channel surfaces 78 and 80 may cause the pressure vessel 92 to expand in a vertically upward direction and thereby push the bottom heat management device 54 vertically within the base channel 72 away from the channel end surface 78. However, when the pressure vessel 92 contracts in size, the pressure vessel 92 may contract in a vertically downward direction and the bottom heat management device 54 may move vertically within the base channel 72 towards from the channel end surface 78.

In some embodiments, a spacer 96 may be disposed within the base channel 72 vertically between the pressure vessel 92 and the bottom heat management device 54. This spacer 96 may be configured to provide a thermal break/a thermal insulator between the bottom heat management device 54 and the pressure vessel 92. The spacer 96, for example, may be constructed from a thermally insulating material such as, but not limited to, silicon.

Figure 5:
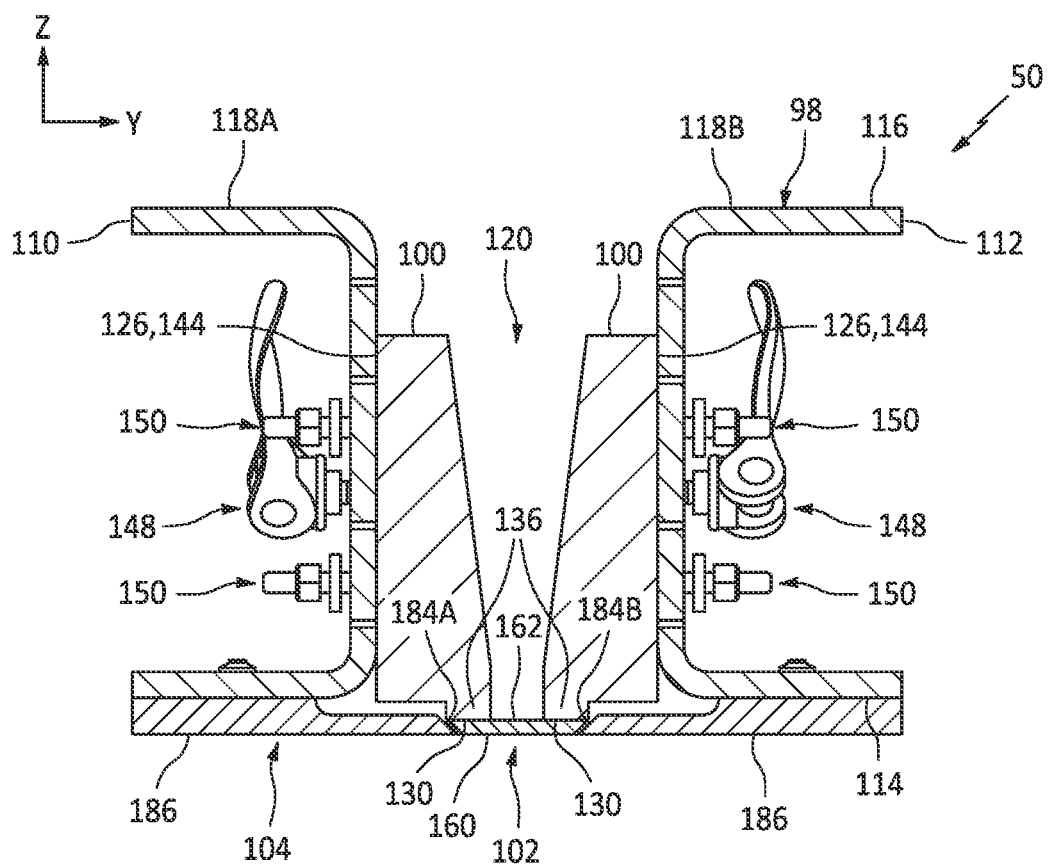
FIG. 5 is a cross-sectional illustration of a top support structure.

Referring to FIG. 5, the top support structure 50 includes a frame 98, a plurality of trunks 100 and a top heat management device or heat shield 102. The top support structure 50 of FIG. 5 also includes a top heat shield holder 104.

Figure 6:
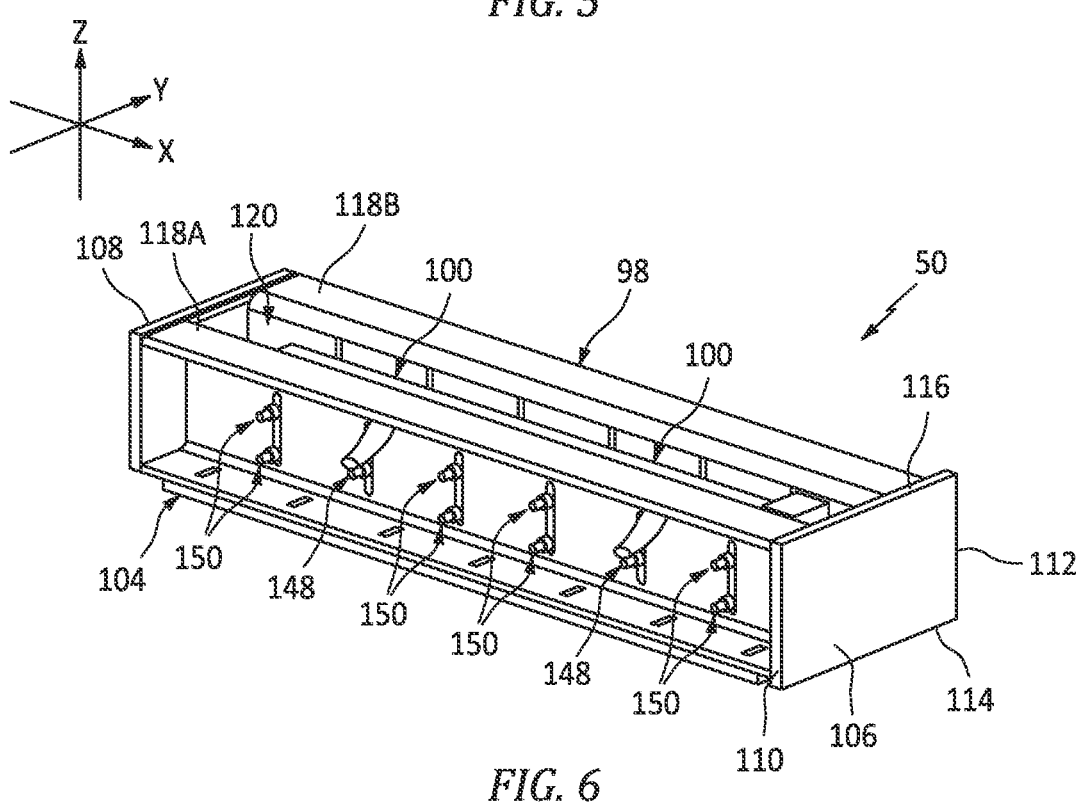
FIG. 6 is a perspective illustration of the top support structure.

Referring to FIG. 6, the support structure frame 98 extends longitudinally between and to a first end 106 of the support structure frame 98 and a second end 108 of the support structure frame 98. The support structure frame 98 extends laterally between and to a first side 110 of the support structure frame 98 and a second side 112 of the support structure frame 98. The support structure frame 98 extends vertically between and to a bottom side 114 of the support structure frame 98 and a top side 116 of the support structure frame 98.

The support structure frame 98 of FIG. 6 includes one or more frame beams 118A and 118B (generally referred to as "118"). These frame beams 118 are arranged parallel with one another. Each of the frame beams 118 extends longitudinally between and to (or about) the opposing frame ends 106 and 108. Each of the frame beams 118 extends vertically between and to the opposing frame sides 114 and 116. The first beam 118A is arranged at (e.g., on, adjacent or proximate) the frame first side 110. The second beam 118B is arranged at (e.g., on, adjacent or proximate) the frame second side 112. The first beam 118A and the second beam 118B are laterally displaced from one another by an inter-beam channel 120.

Referring to FIG. 5, each of the frame beams 118 may have a channeled (e.g., C-channel) cross-sectional geometry when viewed, for example, in a plane perpendicular to the longitudinal x-axis; e.g., plane of FIG. 5. The support structure frame 98 of the present disclosure, however, is not limited to such an exemplary frame beam configuration.

The support structure frame 98 and each of its beams 118 may be constructed from metal such as, but not limited to, steel. The present disclosure, however, is not limited to such exemplary support structure frame materials.

Figure 7:
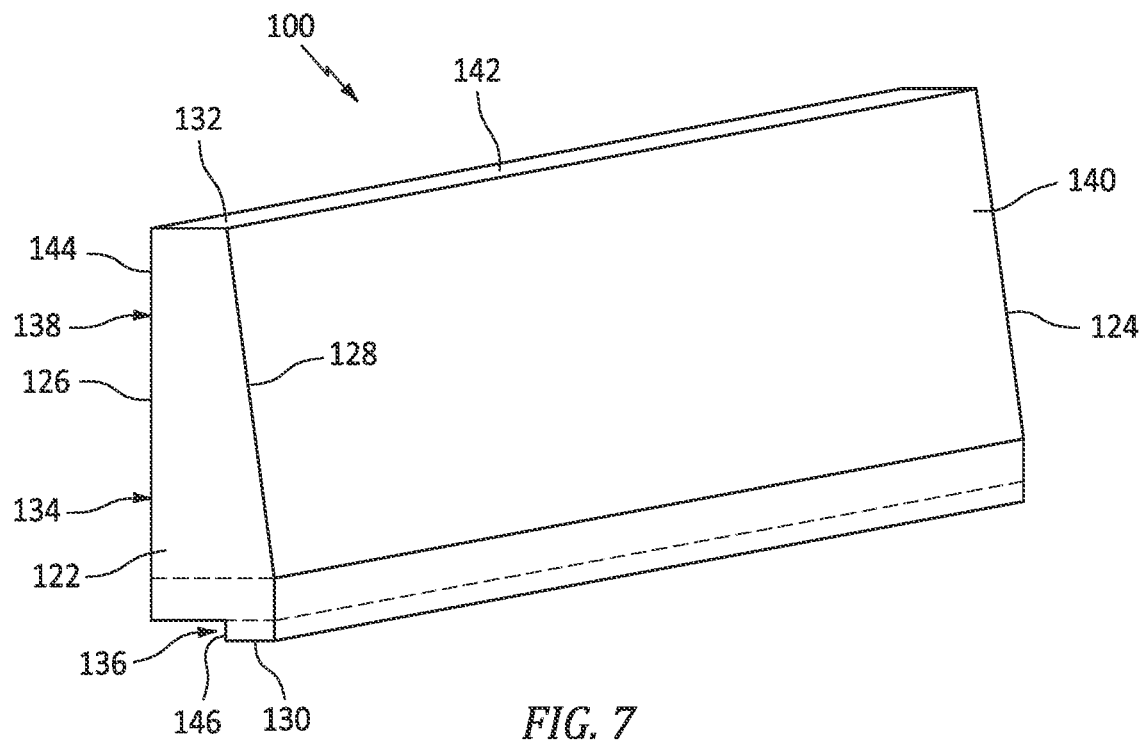
FIG. 7 is a perspective illustration of a trunk.

Referring to FIG. 7, each trunk 100 may be configured as a support block. Each trunk 100, for example, extends longitudinally between and to a first end 122 of the respective trunk 100 and a second end 124 of the respective trunk 100. Each trunk 100 extends laterally between a first side 126 of the respective trunk 100 and a second side 128 of the respective trunk 100. Each trunk 100 extends vertically between a bottom side 130 of the respective trunk 100 and a top side 132 of the respective trunk 100.

Each trunk of FIG. 7 includes a trunk base 134 and a trunk protrusion 136; e.g., a clamp head. Each of these trunk elements 134 and 136 may extend longitudinally between and to the opposing trunk ends 122 and 124.

The trunk base 134 is arranged at (e.g., on, adjacent or proximate) the trunk top side 132. The trunk base 134 of FIG. 7, for example, extends vertically from the trunk top side 132 towards the trunk bottom side 130. This trunk base 134 extends laterally between and to the opposing trunk sides 126 and 128. At least a portion 138 (or an entirety) of the trunk base 134 may be laterally tapered. The trunk portion 138 of FIG. 7, for example, laterally tapers as the trunk base 134 extends vertically to the trunk top side 132. This tapered configuration provides the trunk base 134 with a canted exterior surface 140 extending along the trunk second side 128. This second side surface 140 is angularly offset from an exterior surface 142 of the trunk 100 extending along the trunk top side 132 by an included angle; e.g., an obtuse angle. The second side surface 140 is angularly offset from an exterior surface 144 of the trunk 100 extending along the trunk first side 126 by an included angle; e.g., an acute angle. The first side surface 144, by contrast, may be configured perpendicular to the top side surface 142.

The trunk protrusion 136 is arranged at (e.g., on, adjacent or proximate) the trunk bottom side 130. The trunk protrusion 136 of FIG. 7, for example, projects vertically out from the trunk base 134 to the trunk bottom side 130. The trunk protrusion 136 is arranged at (e.g., on, adjacent or proximate) the trunk second side 128. The trunk protrusion 136 of FIG. 7, for example, projects laterally from the trunk second side 128 to a side 146 of the trunk protrusion 136 which is laterally displaced from the trunk first side 126.

Each trunk 100 may be constructed from a non-electrically conductive material. This non-electrically conductive material may be a polymer such as, but not limited to, polyurethane. The present disclosure, however, is not limited to the foregoing exemplary trunk materials.

Figure 8:
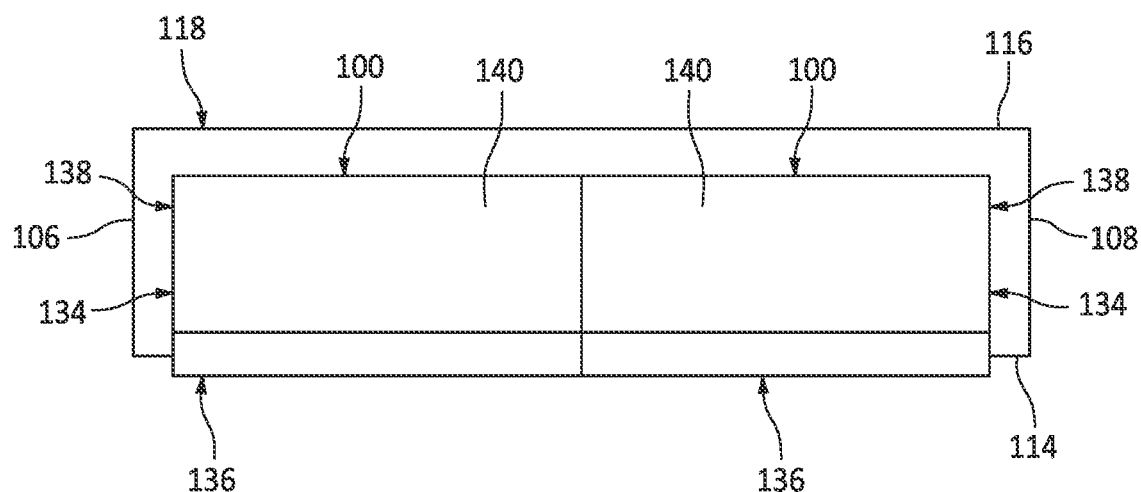
FIG. 8 is a side view illustration of a set of the trunks arranged with a beam of the top support structure.

Referring to FIG. 5, the trunks 100 are arranged within the inter-beam channel 120. Referring to FIG. 8, each of the frame beams 118 is configured with a set (e.g., a row) of one or more of the trunks 100. Each set of the trunks 100, for example, may be arranged end-to-end longitudinally along a respective one of the frame beams 118, where the trunk first sides 126 laterally engage (e.g., contact, abut) the respective frame beam 118; see FIG. 5.

Referring to FIGS. 5 and 6, each of the trunks 100 is connected to the respective frame beam 118 in a repositionable manner. For example, each trunk 100 of FIGS. 5 and 6 is secured to the respective frame beam 118 by a quick release coupler 148 and one or more fastener assemblies 150; e.g., bolt and nut assemblies. Each of these connectors 148 and 150 may be mated with a respective aperture (e.g., slot) in a web of the frame beam 118, which aperture is sized to facilitate vertical (e.g., up and down) movement of the trunk 100 along the respective frame beam 118 and its web. The quick release coupler 148 is configured to temporarily maintain a vertical position of the respective trunk 100 along the respective frame beam 118 while the fastener assemblies 150 are loose. The fastener assemblies 150 are configured to fix the vertical position of the respective trunk 100 for the induction welding of the workpiece 22 (see FIG. 1). Each of the fastener assemblies 150, for example, may be tightened to clamp the respective trunk 100 laterally against the respective frame beam 118 and its web and thereby fix the vertical position of the trunk 100.

Figure 9:
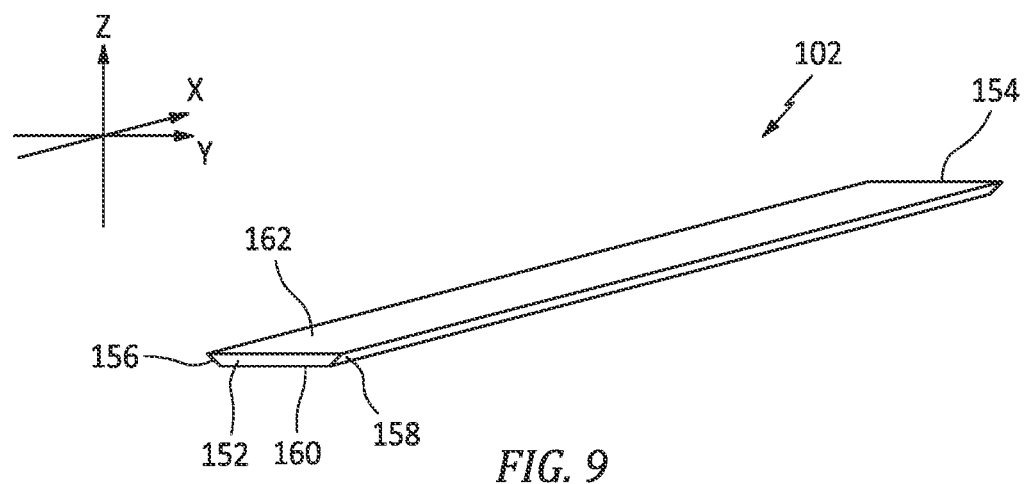
FIG. 9 is a perspective illustration of a heat shield.

Referring to FIG. 9, the top heat shield 102 is configured as a component operable to absorb heat energy. The top heat shield 102, for example, may be constructed from a ceramic such as, but not limited to, aluminum silicate (also referred to as alumina silicate). The present disclosure, however, is not limited to the foregoing exemplary top heat shield materials.

The top heat shield 102 of FIG. 9 extends longitudinally between and to a first end 152 of the top heat shield 102 and a second end 154 of the top heat shield 102. The top heat shield 102 extends laterally between and to a first side 156 of the top heat shield 102 and a second side 158 of the top heat shield 102. The top heat shield 102 extends vertically between and to a bottom side 160 of the top heat shield 102 and a top side 162 of the top heat shield 102.

The top heat shield 102 may be laterally tapered. The top heat shield 102 of FIG. 9, for example, laterally tapers as the top heat shield 102 extends vertically from the heat shield top side 162 to the heat shield bottom side 160. The top heat shield 102 of FIG. 9, for example, has a (e.g., isosceles) trapezoidal cross-sectional geometry when viewed, for example, in a plane perpendicular to the longitudinal x-axis. The present disclosure, however, is not limited to such an exemplary second heat shield configuration.

Figure 10:
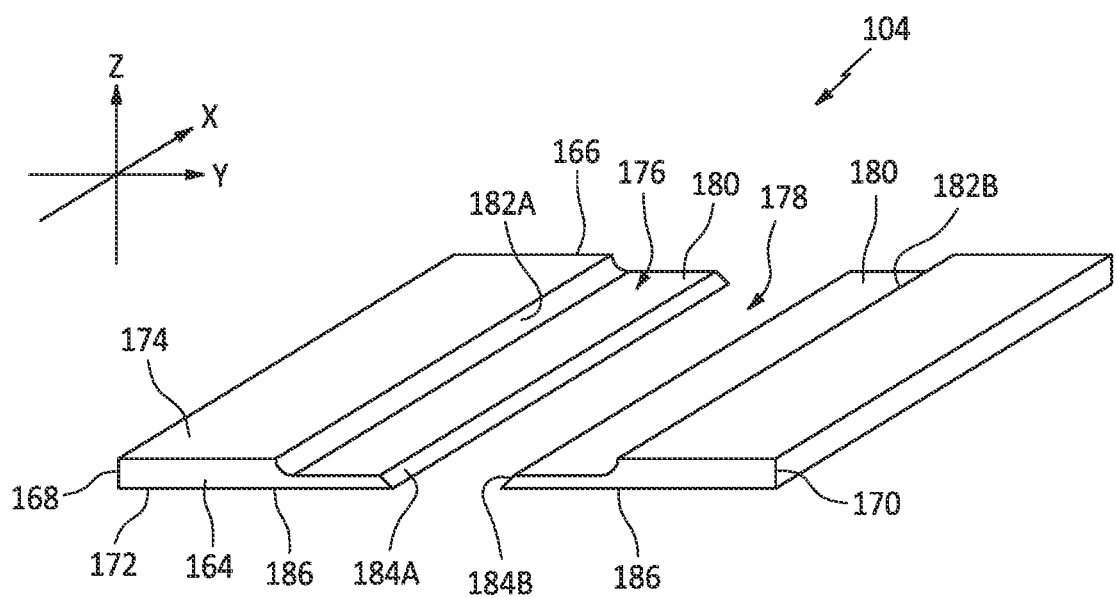
FIG. 10 is a perspective illustration of a heat shield holder.

Referring to FIG. 10, the heat shield holder 104 extends longitudinally between and to a first end 164 of the heat shield holder 104 and a second end 166 of the heat shield holder 104. The heat shield holder 104 extends laterally between and to a first side 168 of the heat shield holder 104 and a second side 170 of the heat shield holder 104. The heat shield holder 104 extends vertically between and to a bottom side 172 of the heat shield holder 104 and a top side 174 of the heat shield holder 104.

The heat shield holder 104 of FIG. 10 is configured with a trunk recess 176 and a heat shield receptacle 178. Each of these holder apertures 176 and 178 may extend longitudinally through (or within) the heat shield holder 104 between the opposing ends 164 and 166.

The trunk recess 176 is arranged at (e.g., on, adjacent or proximate) the holder top side 174, and intermediate (e.g., midway) laterally between the opposing holder sides 168 and 170. The trunk recess 176 of FIG. 10, for example, extends vertically into the heat shield holder 104 from the holder top side 174 to a recess end surface 180 of the heat shield holder 104. The trunk recess 176 extends laterally within the heat shield holder 104 between and to opposing recess side surfaces 182A and 182B (generally referred to as "182") of the heat shield holder 104. In some embodiments, the opposing recess side surfaces 182 may have an arcuate cross-sectional geometry when viewed, for example, in a plane perpendicular to the longitudinal x-axis.

The heat shield receptacle 178 is located at (e.g., on, adjacent or proximate) the holder bottom side 172, and intermediate (e.g., midway) laterally between the opposing holder sides 168 and 170 and the opposing recess side surfaces 182. The heat shield receptacle 178 of FIG. 10, for example, extends vertically into the heat shield holder 104 from the recess end surface 180 to the holder bottom side 172. The heat shield receptacle 178 extends laterally within the heat shield holder 104 between and to opposing receptacle side surfaces 184A and 184B (generally referred to as "184") of the heat shield holder 104. Each of these receptacle side surfaces 184 may be a canted surface. Each of the receptacle side surfaces 184, for example, may be angularly offset from a surface 186 extending along the holder bottom side 172 by an included angle; e.g., an acute angle. The heat shield receptacle 178 may thereby have, for example, a (e.g., isosceles) trapezoidal cross-sectional geometry when viewed, for example, in a plane perpendicular to the longitudinal x-axis. This trapezoidal cross-sectional geometry may be similar to the trapezoidal cross-sectional geometry of the top heat shield 102 of FIG. 9 in shape, but may be slightly larger in size as shown in FIG. 5.

The heat shield holder 104 may be constructed from a non-electrically conductive material. This non-electrically conductive material may be a polymer such as, but not limited to, polyurethane. The present disclosure, however, is not limited to the foregoing exemplary heat shield holder materials.

Referring to FIG. 5, the heat shield holder 104 is connected to the support structure frame 98 at the frame bottom side 114. The heat shield holder 104, for example, is connected (e.g., mechanically fastened, bonded and/or otherwise attached) to flanges of the frame beams 118 at the frame bottom side 114.

The top heat shield 102 is mated with (e.g., received within) the heat shield receptacle 178 (see FIG. 10). The receptacle side surfaces 184 laterally overlap end portions of the top heat shield 102. The receptacle side surfaces 184 may thereby locate and vertically support the top heat shield 102 in its mated position. The trunks 100 may also be vertically positioned such that their projections 136 vertically engage (e.g., contact) and/or abut against the heat shield top side 162. The trunks 100 may thereby retain the top heat shield 102 within the heat shield receptacle 178 (see FIG. 10). The trunks 100 also provide a support (e.g., a backstop) for the top heat shield 102 during induction welding as described below in further detail.

Figure 11:
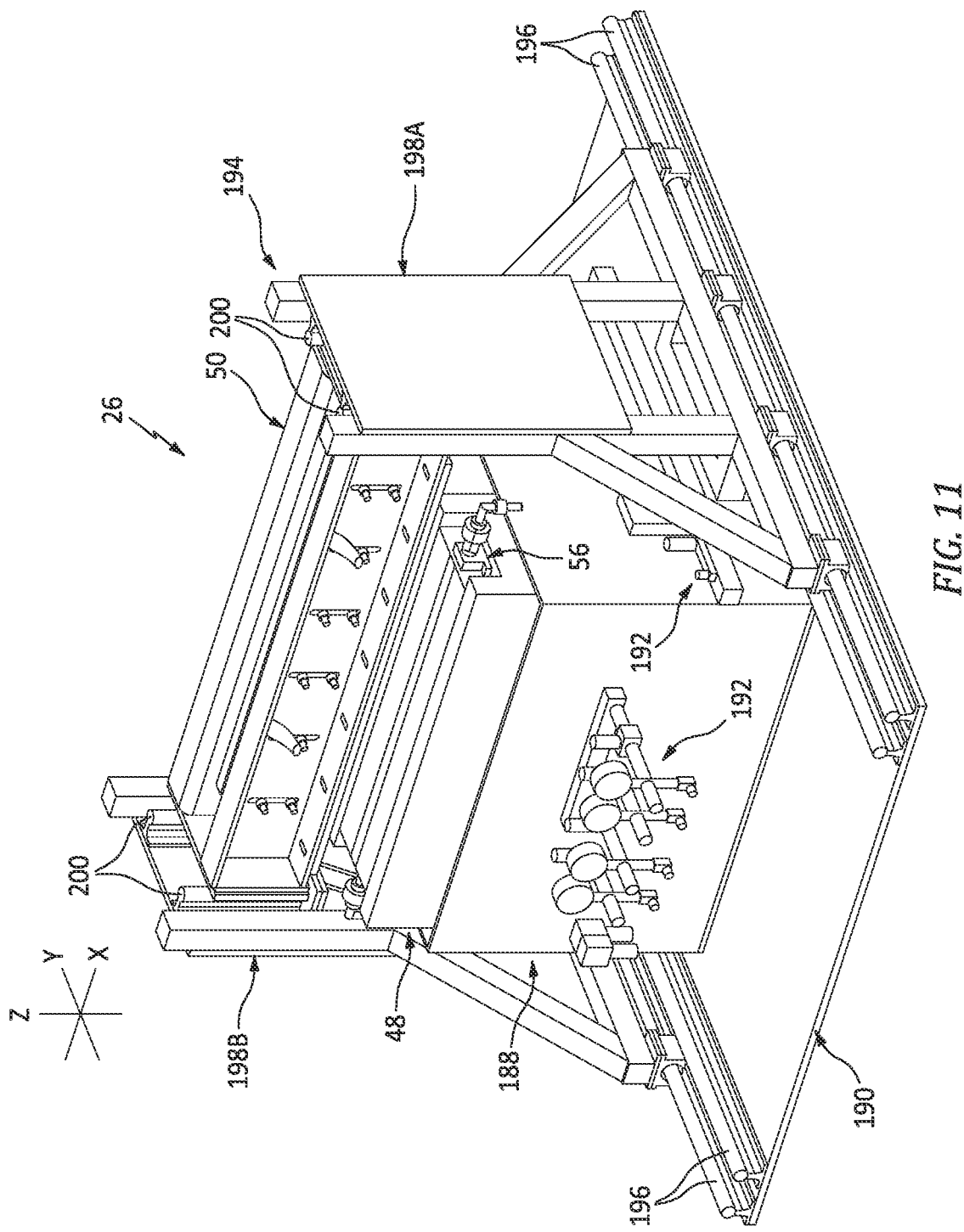
FIG. 11 is a perspective illustration of an induction welding fixture configured with the bottom support structure and the top support structure.

Referring to FIG. 11, the bottom support structure 48 may be mounted on a (e.g., fixed, stationary) base structure 188; e.g., a mounting block. The base structure 188 of FIG. 11 is configured to vertically elevate the bottom support structure 48 off of a floor 190; e.g., a metal plate or pan. The base structure 188 is also configured to provide mounting areas for fixture accessories 192 such as, but not limited to, valving and/or gauges for controlling and/or monitoring the actuator 56. Note, connections (e.g., conduits) between the elements 56 and 192 are omitted for clarity of illustration.

The top support structure 50 may be configured as part of a gantry 194. The gantry 194 of FIG. 11 is configured to move laterally (e.g., along the y-axis) along one or more tracks 196 (e.g., rails), which tracks 196 are disposed on opposing lateral sides of the base structure 188 and connected to the floor 190. The gantry 194 of FIG. 11 includes one or more vertical supports 198A and 198B (generally referred to as "198"); e.g., side frames. The top support structure 50 is vertically displaced from (e.g., positioned vertically above) the bottom support structure 48. The top support structure 50 is arranged longitudinally between and connected to the vertical supports 198. The top support structure 50 of FIG. 11 is configured to move vertically (e.g., along the z-axis) along one or more tracks 200 (e.g., rails), which tracks 200 are respectively connected to and extend vertically along the vertical supports 198. One or more actuators (e.g., hydraulic cylinders) may be configured to move the top support structure 50 along the tracks 200. One or more actuators (e.g., hydraulic cylinders) may also or alternatively be configured to move the gantry 194 along the tracks 196. Of course, in other embodiments, the top support structure 50 and/or the gantry 194 may be manually moveable.

Figure 12:
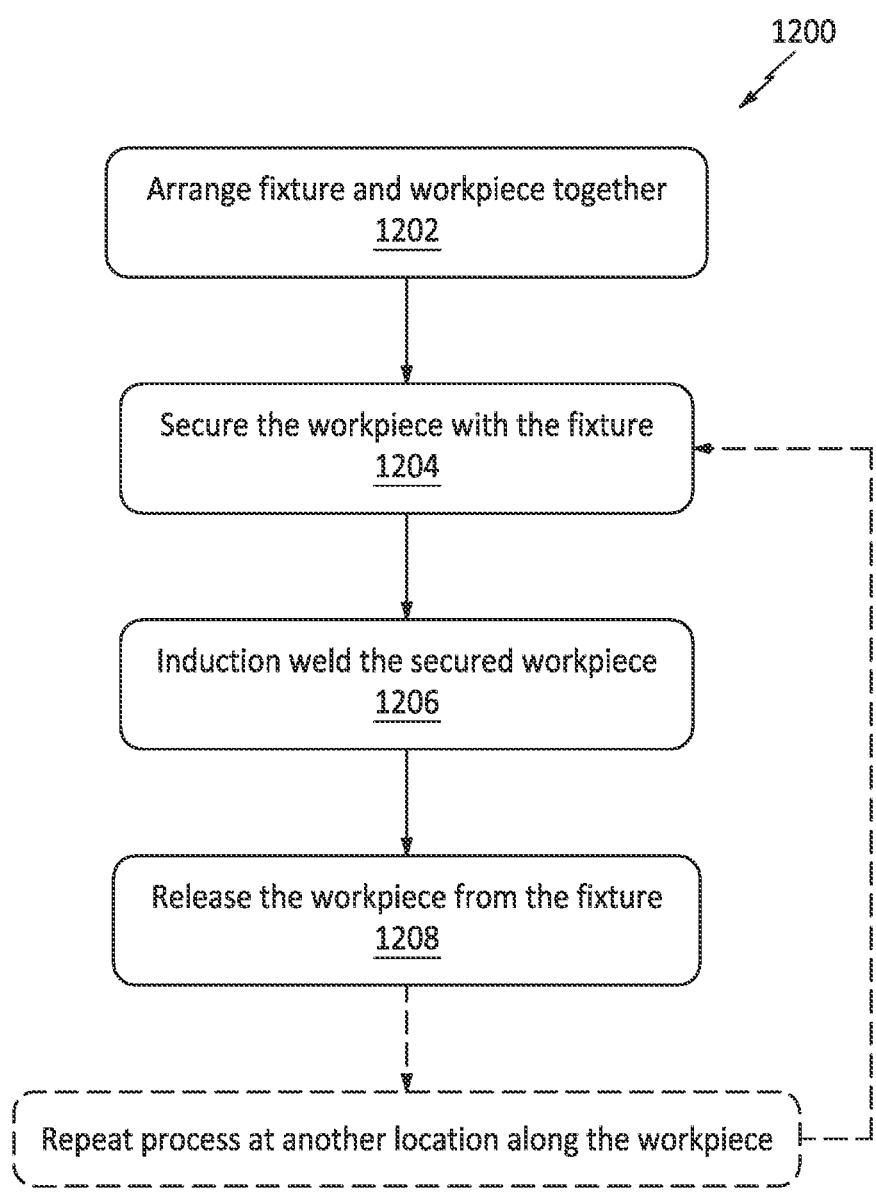
FIG. 12 is a flow diagram of a method for induction welding the workpiece.

FIG. 12 is a flow diagram of a method 1200 for induction welding a workpiece; e.g., the workpiece 22. This method 1200 may be performed using an induction welding system such as, but not limited to, the induction welding system 20 of FIG. 1.

Figure 13:
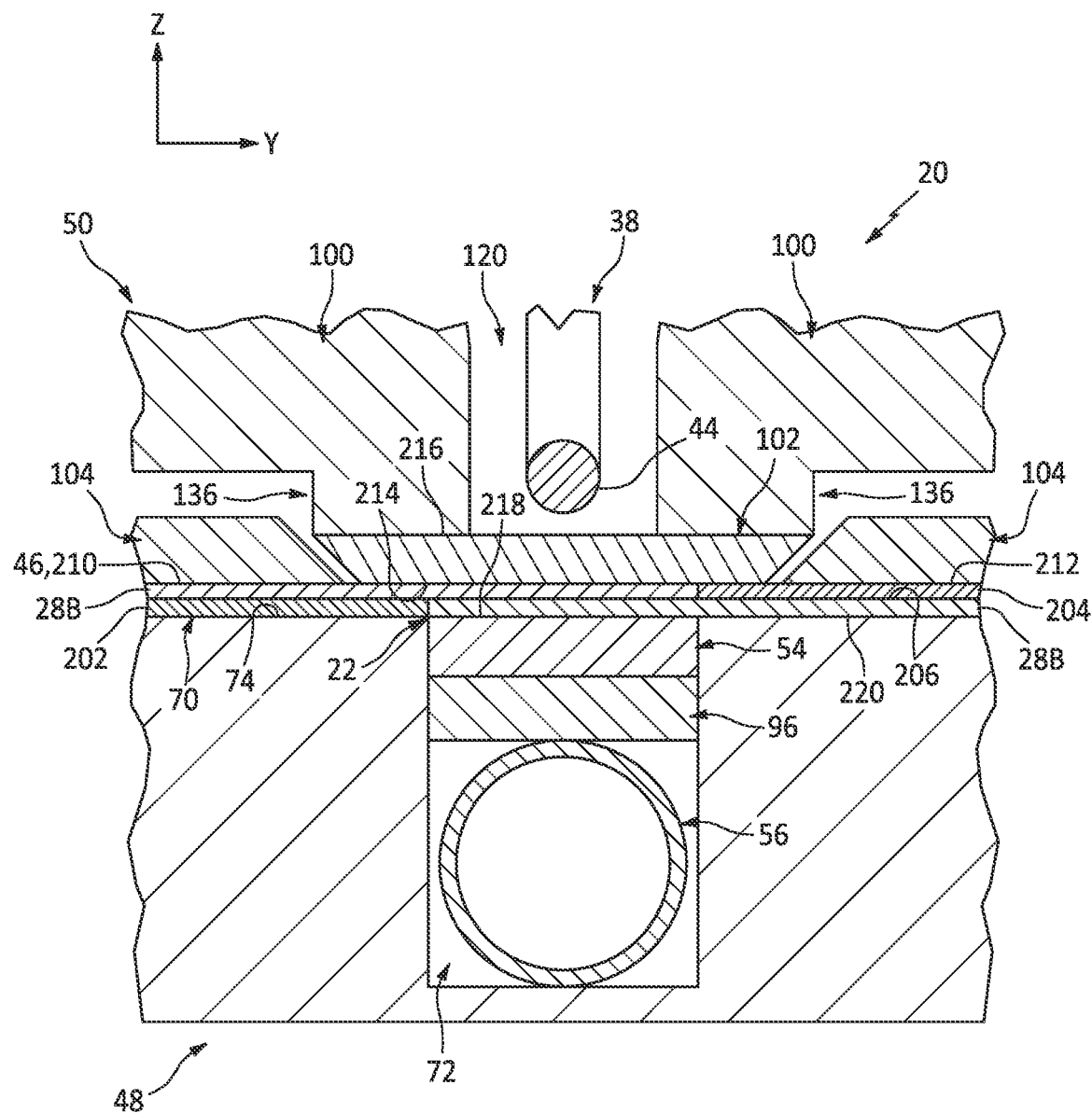
FIG. 13 is a cross-sectional illustration of a portion of the induction welding system.

In step 1202, the induction welding fixture 26 and the workpiece 22 are arranged together. The workpiece 22 and its members 28, for example, may be arranged vertically between the bottom support structure 48 and the top support structure 50. For example, referring to FIG. 13, the workpiece 22 may be arranged within the workpiece receptacle 70. A portion of the first workpiece member 28A may laterally and longitudinally overlap (e.g., lap) a portion of the second workpiece member 28B. One or more workpiece shims 202 and 204 may be provided to support the workpiece members 28, which workpiece shims 202 and 204 may be constructed from a composite material such as fiberglass embedded within an epoxy matrix. Each of these shims 202 and 204 may be arranged within the workpiece receptacle 70 with the workpiece 22. The bottom shim 202 of FIG. 13, for example, is located laterally adjacent (e.g., abutted against)

a lateral edge of the first workpiece member 28A. This bottom shim 202 is located vertically between and engages (e.g., contacts) the receptacle end surface 74 and the second workpiece member 28B. The top shim 204 of FIG. 13 is located laterally adjacent (e.g., abutted against) a lateral edge of the second workpiece member 28B. This top shim 204 is located vertically on a (e.g., top) surface 206 of the first workpiece member 28A.

In step 1204, the workpiece 22 is secured vertically between the bottom support structure 48 and the top support structure 50. The top support structure 50 of FIG. 11, for example, may be moved along the tracks 200 until the top support structure 50 engages (e.g., contacts) one or more of the elements 22, 28B, 204; e.g., see FIGS. 1 and 13. The heat shield holder 104 of FIG. 1, for example, may vertically contact a top surface 208 of the support structure base 52 at its top end 68. Referring to FIG. 13, the heat shield holder 104 may vertically contact a top surface 210 of the second workpiece member 28B and a top surface 212 of the top shim 204. A bottom workpiece contact surface 214 of the top heat shield 102 may abut vertically against and contact the second workpiece member surface 210 and/or the second shim surface 212. The top heat shield 102 may thereby engage a top side of the workpiece 22 and its top surface 46.

The trunks 100 may be adjusted vertically such that the trunk protrusions 136 engage (e.g., contact) a top surface 216 of the top heat shield 102, which surface 216 is vertically opposite the heat shield surface 214. The trunks 100 may thereby provide a backstop for the top heat shield 102 as well as retain the top heat shield 102 against the workpiece 22 and its members 28.

The actuator 56 may be actuated (e.g., inflated) to move (e.g., push) the elements 54 and 96 vertically upwards within the base channel 72 towards the workpiece 22. This movement may cause the bottom heat management device 54 to vertically engage (e.g., contact) at least the workpiece 22 at a bottom side thereof. More particularly, a top workpiece contact surface 218 of the bottom heat management device 54 may abut vertically against and contact a bottom surface 220 of the first workpiece member 28A. The actuator 56 may be actuated further such that the workpiece 22 and its overlapping members 28 are pressed (e.g., clamped) vertically between the support structures 48 and 50 and their heat management devices 54 and 102. The workpiece 22 and its members 28 may thereby be secured (e.g., clamped) vertically between the support structures 48 and 50 and, more particularly, the heat management devices 54 and 102 using the trunks 100 as a backstop/anchor for the top heat shield 102.

Figure 14:
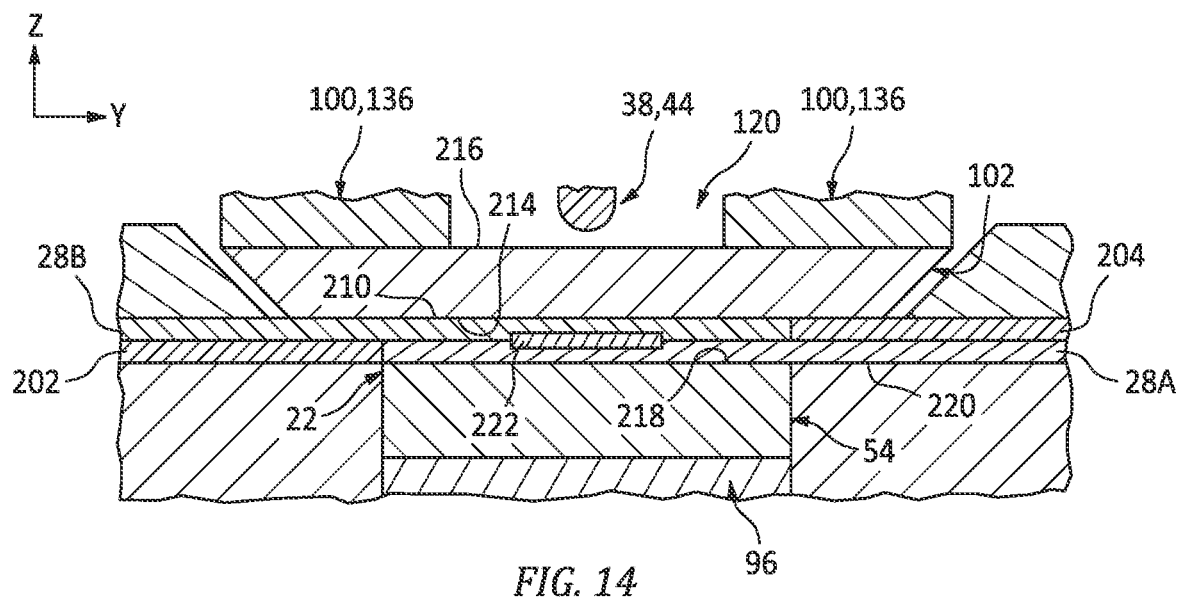
FIG. 14 is a cross-sectional illustration of a portion of the induction welding system during induction welding of a plurality of workpiece members together.

In step 1206, the workpiece 22 is induction welded. The induction welding coil 38, for example, may be arranged in the channel 120 between the trunks 100 such that the welding segment 44 is parallel with and slightly elevated from the heat shield surface 216. Once in position, the power source 30 (see FIG. 1) may provide a high frequency (e.g., alternating) current to the induction welding coil 38. The induction welding coil 38 may subsequently generate electromagnetic waves which excite one or more reinforcement fibers within the first workpiece member 28A via eddy currents and/or one or more of reinforcement fibers within the second workpiece member 28B via eddy currents. This excitation may elevate a temperature of the first workpiece member 28A and/or the second workpiece member 28B to a melting point temperature where a polymer (e.g., thermoplastic) matrix of the first workpiece member 28A and/or a polymer (e.g., thermoplastic) matrix of the second workpiece member 28B melts. Referring to FIG. 14, a melt layer may form at an interface 222 (e.g., a weld joint/seam) between the first workpiece member 28A and the second workpiece member 28B. This melt layer may bond the first workpiece member 28A and the second workpiece member 28B together upon cooling thereof.

The induction welding coil 38 may be moved longitudinally (e.g., in the x-axis direction) to provide an elongated welded seam between the first workpiece member 28A and the second workpiece member 28B. As the induction welding coil 38 moves longitudinally, the induction welding coil 38 translates longitudinally within the channel 120 along the trunks 100 on either side thereof.

By securing the workpiece 22 between the support structures 48 and 50 and their heat management devices 54 and 102 during the induction welding, the induction welding fixture 26 may maintain contact between the workpiece members 28 being welded together. The induction welding fixture 26 may also maintain a compressive force across the overlap joint between the workpiece members 28 to facilitate improved fusion. The heat management devices 54 and 102 may also or alternatively provide uniform heat for welding at the interface 222.

In step 1208, the workpiece 22 is released from the induction welding fixture 26. The actuator 56 of FIG. 13, for example, may be actuated (e.g., deflated) such that the bottom heat management device 54 moves (e.g., inwards) away from the workpiece 22. The top support structure 50 may then be moved vertically (e.g., upwards) away from the workpiece 22. The now fused workpiece 22 may subsequently be removed from the induction welding fixture 26. Alternatively, the induction welding fixture 26 and the workpiece 22 may be rearranged to induction weld the workpiece 22 at another location; e.g., another location laterally along the workpiece 22. The steps 1204, 1206 and 1208 may be repeated at this other location to further induction weld the workpiece 22. For example, the first and the second workpiece members 28 may be welded together again at the other location to provide another weld seam. Alternatively, one or more other members 28 of the workpiece 22 may alternatively be induction welded together.

Figure 15A:
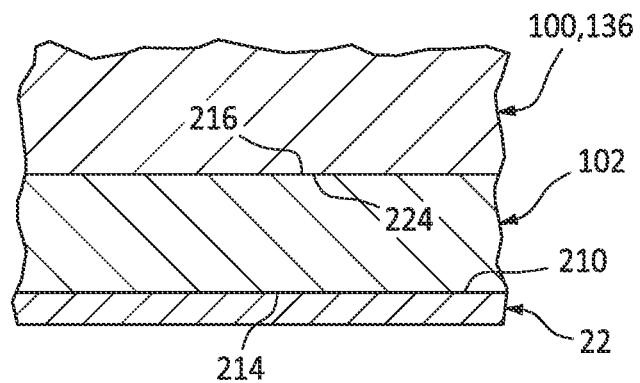
FIG. 15A is a sectional illustration of a portion of the top support structure engaging a workpiece with a planar configuration.
Figure 15B:
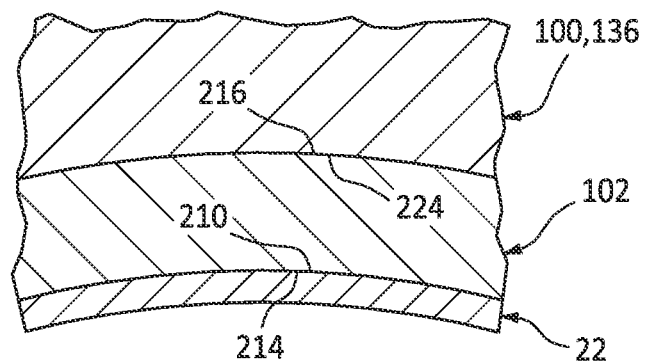
FIG. 15B is a sectional illustration of a portion of the top support structure engaging a workpiece with a non-planar configuration.

To accommodate induction welding of the workpiece 22 at multiple locations and/or induction welding workpieces 22 with various different configurations, the induction welding fixture 26 of the present disclosure is configured with multiple adjustable components. For example, the top support structure 50 may be moved laterally (e.g., via the gantry 194) and/or vertically to facilitate placement of the workpiece 22 with the induction welding fixture 26. The top support structure 50 may also or alternatively be moved to accommodate different workpiece thicknesses. The trunks 100 may be adjusted vertically for adjusting the backstop position of the top heat shield 102. The trunks 100 may also be adjusted vertically for removal and replacement of the top heat shield 102. One or more of the trunks 100 may also be swapped out (e.g., exchanged) for replacement trunks 100. By replacing the top heat shield 102 and/or the trunks 100, the induction welding fixture 26 may accommodate workpieces with different surface geometries (e.g., planar, curved or otherwise) along the overlap joint or the same workpiece with different surface geometries at different weld locations. For example, referring to FIG. 15A, where the exterior surface 210 of the workpiece 22 is planar (e.g., flat), a bottom (e.g., heat shield engagement) surface 224 of each trunk protrusion 136 and/or the heat shield surface 214, 216 may also be planar. Referring to FIG. 15B, where the exterior surface 210 of the workpiece 22 is curved, one or more of the trunk protrusions surfaces 224 and/or the heat shield surface 214, 216 may also be curved. Similarly, the bottom heat management device 54 and/or the workpiece shims 202 and 204 may be replaced depending upon the specific geometry of the workpiece 22 to be induction welded. In addition or alternatively, the support structure base 52 may also or alternatively be replaced in order to accommodate induction welding of workpieces with different configurations.

The method is described above as the induction welding fixture 26 being stationary and the workpiece 22 being moveable to adjust the position of the workpiece 22 relative to the induction welding fixture 26. However, in other embodiments, the workpiece 22 may be stationary and the induction welding fixture 26 may be moveable to adjust the position of the induction welding fixture 26 relative to the workpiece 22. In still other embodiments, both the induction welding fixture 26 and the workpiece 22 may be moveable for increasing adjustment options.

Figure 16A:
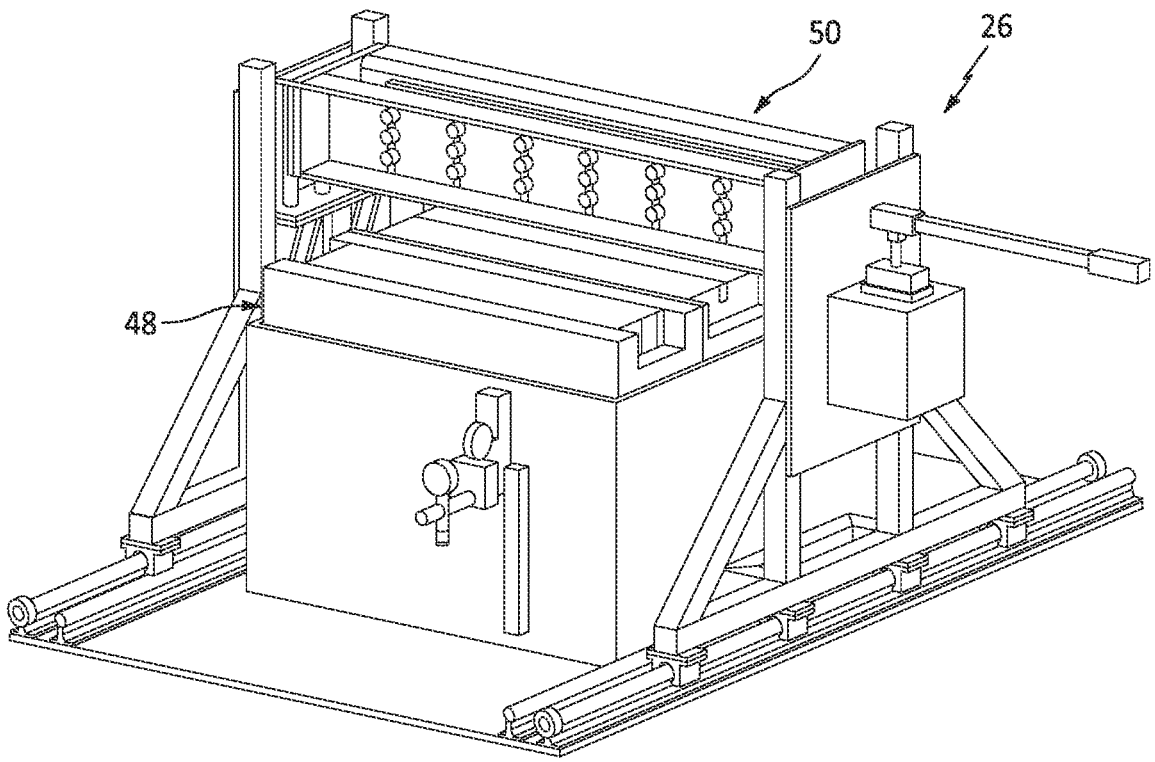
FIG. 16A is a perspective illustration of the induction welding fixture with a rectangular configuration.
Figure 16B:
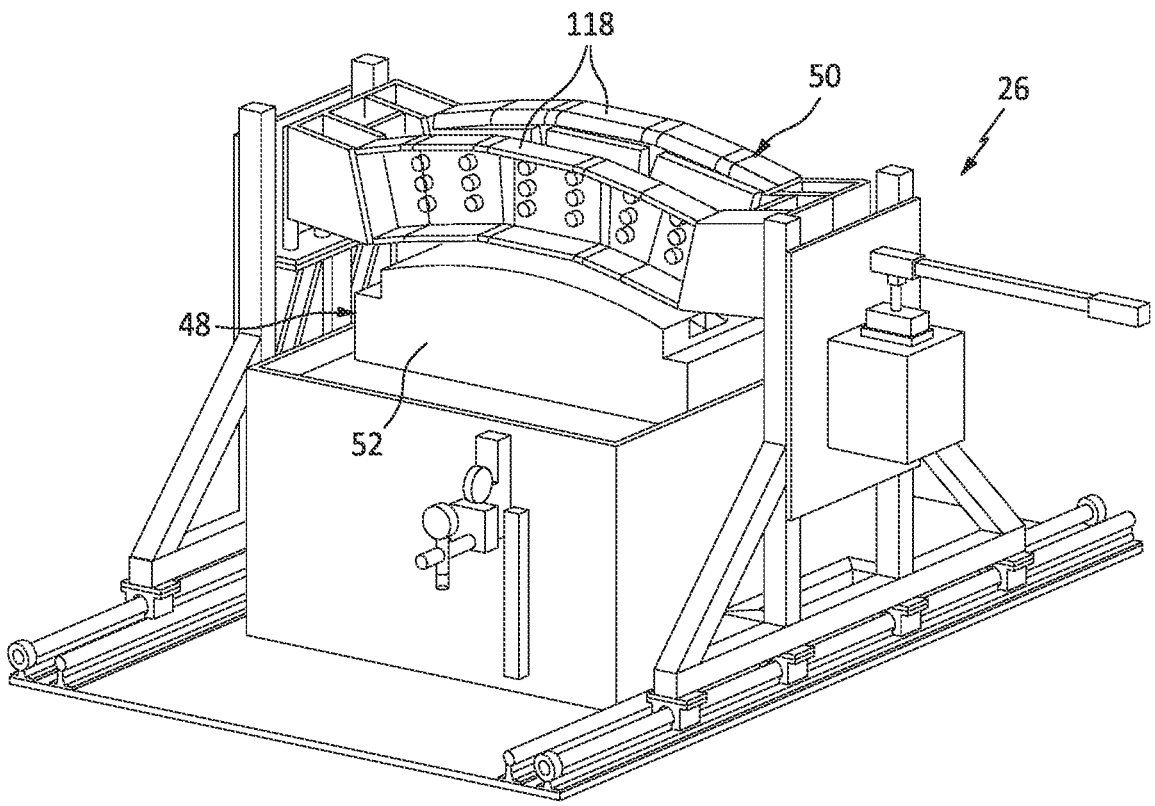
FIG. 16B is a perspective illustration of the induction welding fixture with a non-rectangular configuration.

In some embodiments, the induction welding fixture 26 may have a generally rectangular configuration as shown in FIG. 16A (see also FIG. 1). In other embodiments, the induction welding fixture 26 may have a non-rectangular configuration as shown in FIG. 16B. The induction welding fixture 26 of FIG. 16B, for example, may be particularly suited for induction welding curved (e.g., arcuate) workpieces. The beams 118 and/or the base 52, for example, may be curved or include curved portions.

The method 1200 and the induction welding system 20 of the present disclosure may be utilized for induction welding various different types and configurations of workpieces 22. For example, the workpiece 22 may be configured as a fan cowl for a nacelle of an aircraft propulsion system. The workpiece 22, however, may alternatively be configured as or may otherwise be included as part of another nacelle component, an aircraft control surface, a wing or an aircraft fuselage. The present disclosure, however, is not limited to induction welding and manufacturing such exemplary components or to aircraft propulsion system applications. For example, the method 1200 and the induction welding system 20 may be utilized for manufacturing any type or configuration of workpiece where two or more bodies (e.g., workpiece members 28) are joined together via induction welding.

Figure 17A:
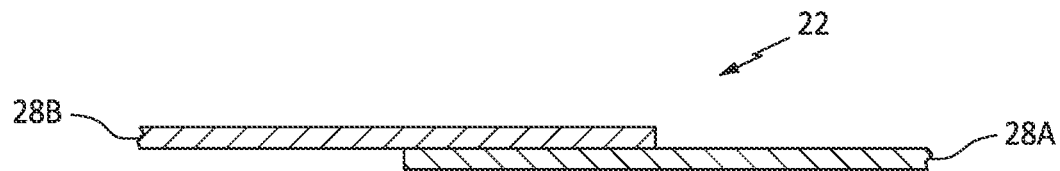
FIGS. 17A-17C are sectional illustrations of interfaces between various different workpiece members.
Figure 17B:
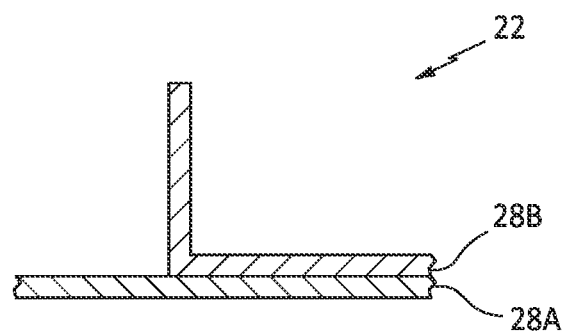
Figure 17C:
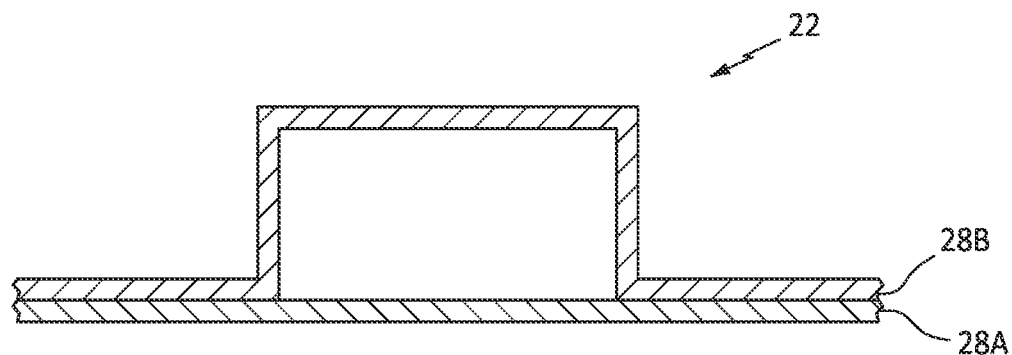

In some embodiments, referring to FIG. 17A, the workpiece members 28 may be configured as planar or non-planar (e.g., curved) sheets of material. In other embodiments, referring to FIGS. 17B and 17C, any one or more of the workpiece members 28 (e.g., 28B) may be configured with more complex (e.g., convoluted, bent, etc.) geometry. The workpiece member 28B of FIG. 17B, for example, is configured with an L-shaped cross-sectional geometry, for example, to provide the workpiece with a flange. The workpiece member 28B of FIG. 17C is configured with a channeled (e.g., top-hat shaped) geometry, for example, to provide the workpiece 22 with a stiffener, a mount and/or a channel. The present disclosure, however, is not limited to the foregoing exemplary workpiece member configurations.

Figure 18:
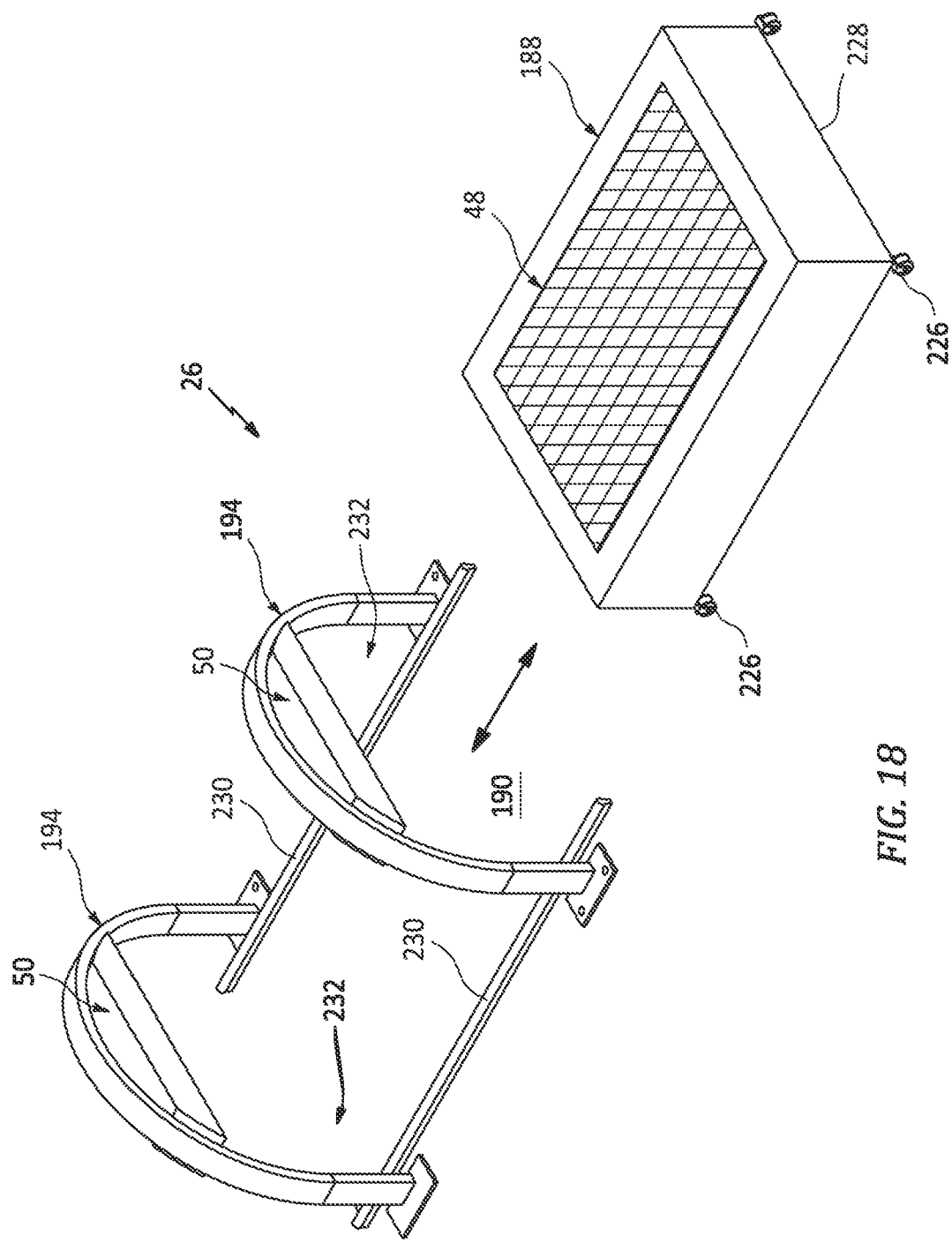
FIG. 18 is a schematic illustration of the induction welding system configured with a plurality of top support structures.

In some embodiments, referring to FIG. 18, the bottom support structure 48 may be configured as a mobile unit. The base structure 188 of FIG. 18, for example, includes one or more wheels 226. These wheels 226 are connected to the base structure 188 at a bottom surface 228 of the base structure 188. The wheels 226 may be operable to move freely on the floor 190. Alternatively, the wheels 226 may run on one or more tracks 230. With such an arrangement, the bottom support structure 48 may be moved within/into or out of a gantry tunnel 232 to provide additional adjustment and/or facilitate placement and/or removal of the workpiece (not shown in FIG. 18).

In some embodiments, the induction welding fixture 26 may include a plurality of the top support structures 50 (schematically shown in FIG. 18). Each of these top support structures 50 may be arranged with a respective gantry 194, where each gantry 194 may be fixed to the floor 190. With this arrangement, the top support structures 50 may be configured with different trunks 100 (see FIG. 5). The top support structures 50, for example, may be setup to align with respective portions of the workpiece (not shown in FIG. 18) with different geometries. A larger portion or an entirety of the workpiece may thereby be induction welded without requiring readjustment of a single top support structure 50. In addition or alternatively, different locations on the workpiece may be induction welded concurrently; e.g., simultaneously.

While the multiple gantries 194 shown in FIG. 18 are configured as fixed gantries, it is contemplated that one or more of these gantries 194 may alternatively be mobile. Each of the gantries 194 in FIG. 18, for example, may alternatively be configured to move along tracks 196 as shown, for example, in FIG. 11. Each gantry 194 and its respective top support structure 50 may thereby move relative to the bottom support structure 48 and/or relative to the other gantry 194 and its respective top support structure 50.

FIG. 18 illustrates the induction welding fixture 26 with two gantries 194 and two respective top support structures 50. It is contemplated, however, the induction welding fixture 26 may include three or more gantries 194 and/or three or more top support structures 50. Furthermore, while the induction welding fixture 26 is illustrated with a single base structure 188 and a single bottom support structure 48, the present disclosure is not limited to such exemplarily configurations. For example, in addition to or alternatively to including more than one gantry 194/more than one top support structure 50, the induction welding fixture 26 may also include two or more base structures 188 and/or two or more bottom support structures 48.

Figure 19A:
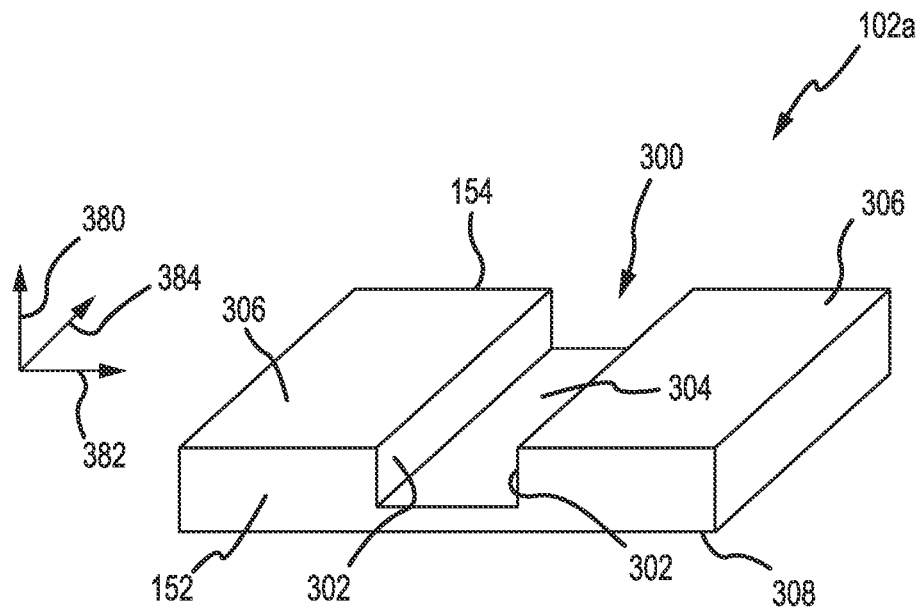
FIG. 19A is a perspective view of a planar heat shield that incorporates a recess.

FIG. 19A illustrates a variation of the above-noted heat shield 102 and is identified by reference numeral 102a. Corresponding components are identified by the same reference numbers, and the foregoing discussion applies unless otherwise noted to the contrary herein. The heat management device or heat shield 102a may be used in place of the heat shield 102 described above (and may be adapted accordingly).

The heat shield 102a may be referenced in relation to a first dimension 380 (the above-noted z direction or dimension), a second dimension 382 (the above-noted y direction or dimension), and a third dimension 384 (the above-noted x direction or dimension). The heat shield 102a extends between the first heat shield end 152 and the second heat shield end 154, where these ends 152, 154 are spaced from one another in the third dimension 384 (e.g., coinciding with a length dimension for the heat shield 102a). A width of the heat shield 102a extends in/coincides with the second dimension 382, while a thickness of the heat shield 102a extends in/coincides with the first dimension 380 (the spacing between a first surface 306 (e.g., flat or planar) and an oppositely disposed second surface 308 (e.g., flat or planar) of the heat shield 102a being in the thickness dimension).

A heat shield recess 300 is incorporated on the first surface 306 of the heat shield 102a, and is concave on/relative to this first surface 306. The heat shield recess 300 is collectively defined by a pair of sidewalls 302 that are spaced from one another in the second dimension 382, along with a base or bottom 304 that extends between the sidewalls 302. The sidewalls 302 and base 304 define the perimeter or boundary of the heat shield recess 300 and may be of any appropriate shape.

Figure 19B:
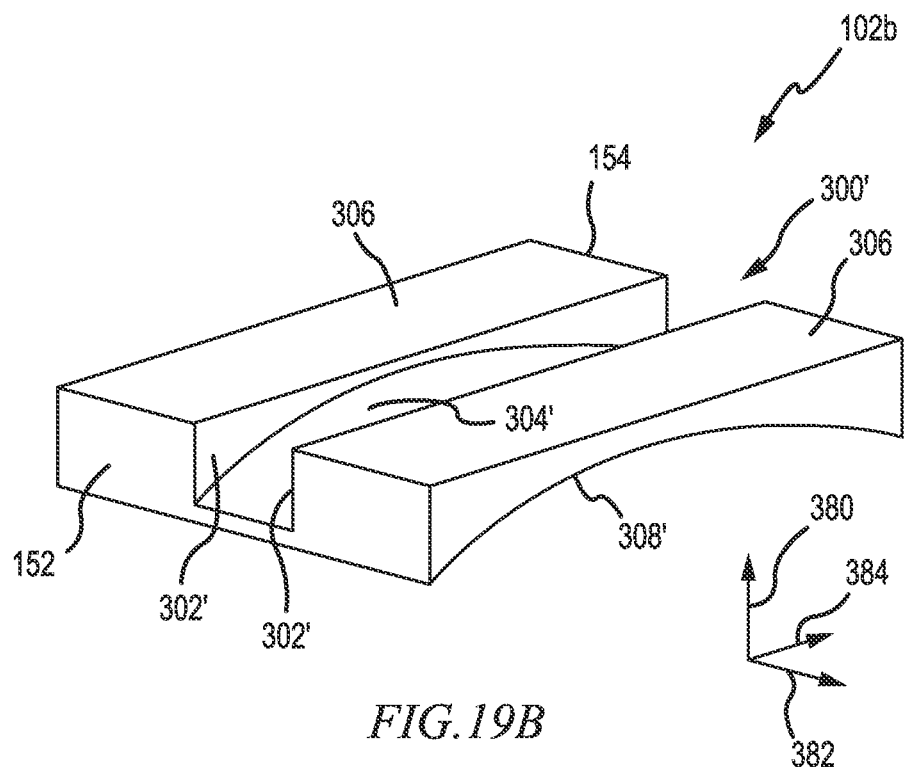
FIG. 19B is a perspective view of a curved heat shield that incorporates a recess.
Figure 19C:
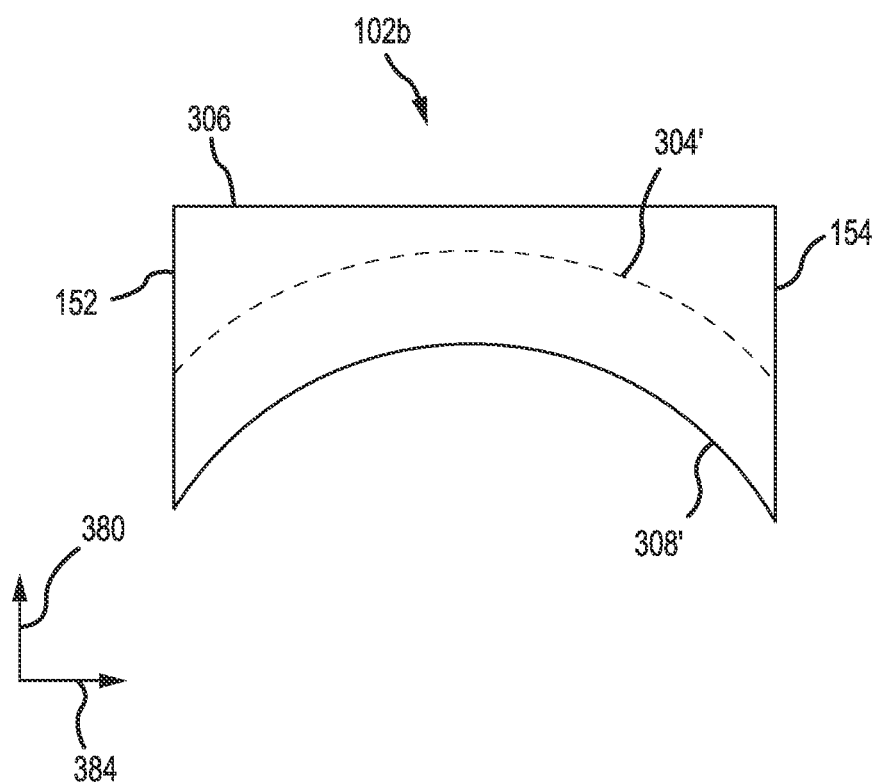
FIG. 19C is a side end view of the heat shield of FIG. 19B.

FIG. 19B and FIG. 19C illustrate a variation of the above-noted heat shield 102 and is identified by reference numeral 102b. Corresponding components are identified by the same reference numbers, and the foregoing discussion applies unless otherwise noted to the contrary. The heat management device or heat shield 102b may be used in place of the heat shield 102 described above (and may be adapted accordingly). In any case, the heat shield 102b is also a variation of the heat shield 102a of FIG. 19A. The primary differences between the heat shield 102a of FIG. 19A and the heat shield 102b of FIG. 19B and FIG. 19C include: 1) that the surface 308' of the heat shield 102b is curved proceeding from the first heat shield end 152 to the second heat shield end 154 (versus flat in the case of surface 308 for the heat shield 102a); 2) the base 304' of the recess 300' is curved proceeding from the first heat shield end 152 to the second heat shield end 154 in the case of the heat shield 102b, and as such the height of the sidewalls 302' may vary proceeding along length of the recess 300' (versus the base 304 being flat in the case of the heat shield 102a); and 3) the surfaces 306, 308' of the heat shield 102b are of different shapes in the case of the heat shield 102b (versus the surfaces 306, 308 being the same shape and parallel to one another in the case of the heat shield 102a).

The first surface 306 for each of the heat shields 102a, 102b (outside the heat shield recess 300, 300', respectively) may be correspondingly-shaped with one or more supports (e.g., trunks) that may engage the heat shield 102a/102b on opposite sides of the heat shield recess 300/300' during induction welding operations, while the second surface 308/308' may be correspondingly-shaped with a corresponding surface of the workpiece being induction welded. In this regard and as representatively illustrated in FIG. 19A for the case of the heat shield 102a, the second surface 308 may be flat or planar within a reference plane that includes the second dimension 382 and the third dimension 384, while the oppositely-disposed first surface 306 may also be flat or planar within a reference plane that contains the second dimension 382 and the third dimension 384, including where the surfaces 306, 308 are parallel. For the case of the heat shield 102b shown in FIG. 19B and FIG. 19C, the second surface 308' may be curved proceeding from the first heat shield end 152 to the oppositely disposed second heat shield end 154 (e.g., curved proceeding in the third dimension 384) and/or may be curved proceeding in the second dimension 382, while the oppositely-disposed first surface 306 is flat or planar within a reference plane that contains the second dimension 382 and the third dimension 384. As such, the surfaces 306, 308' are of different shapes for the case of the heat shield 102b.

The base 304 of the heat shield recess 300 may be correspondingly-shaped with and parallel to the second surface 308 of the heat shield 102a. The thickness of the heat shield 102a within the heat shield recess 300 is then at least substantially constant proceeding from the first heat shield end 152 to the second heat shield end 154, which coincides with the direction of an induction welding operation using the heat shield 102a. As such, the spacing between an induction coil and the workpiece being induction welded remains at least substantially constant as the induction coil moves along the length dimension of the heat shield recess 300 during induction welding operations when using the heat shield 102a (this length dimension coinciding with the spacing between the first heat shield end 152 and the second heat shield end 154 of the heat shield 102a; this length dimension being within/along the third dimension 384).

Similarly, the base 304' of the heat shield recess 300' may be correspondingly-shaped with and parallel to the second surface 308' of the heat shield 102b. The thickness of the heat shield 102b within the heat shield recess 300' is then at least substantially constant proceeding from the first heat shield end 152 to the second heat shield end 154, which coincides with the direction of an induction welding operation using the heat shield 102b. As such, the spacing between an induction coil and the workpiece being induction welded remains at least substantially constant as the induction coil moves along the length dimension of the heat shield recess 300' during induction welding operations when using the heat shield 102a (this length dimension coinciding with the spacing between the first heat shield end 152 and the second heat shield end 154 of the heat shield 102b; this length dimension being within/along the third dimension 384).

Figure 20:
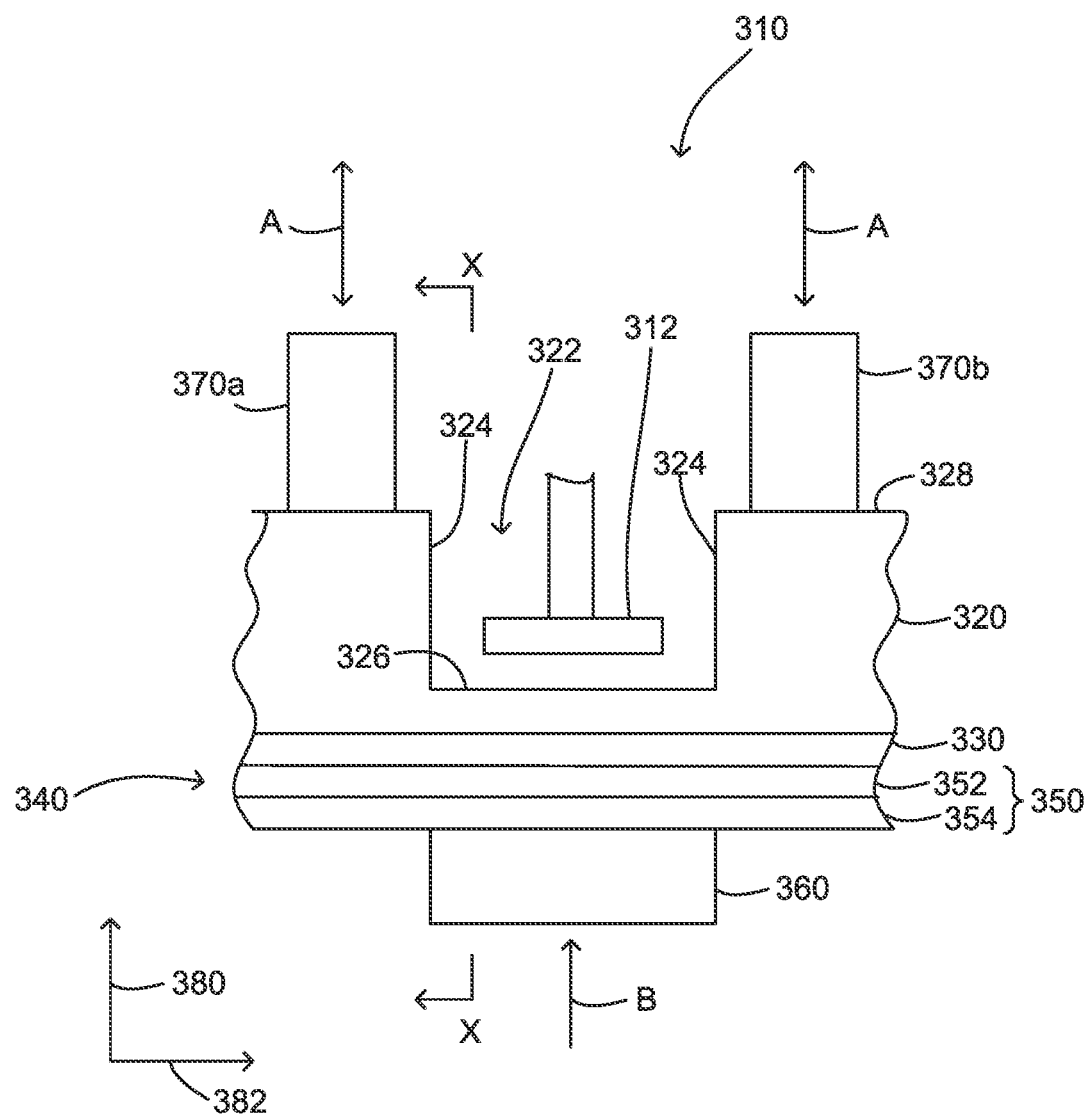
FIG. 20 is a schematic of an induction welding assembly that utilizes a heat shield with a recess.

A schematic of an induction welding assembly is illustrated in FIG. 20 and is identified by reference numeral 310. Unless otherwise noted herein to the contrary, features of the induction welders/welding assemblies discussed above may be utilized by the induction welding assembly 310 of FIG. 20. The induction welding assembly 310 includes a first support 370a (e.g., one of the trunks 100), a second support 370b (e.g., another of the trunks 100), an induction welding coil 312 (e.g., induction welding coil 38), a heat management device or heat shield 320, an optional heat management device 330 (e.g., bottom heat management device 54), a workpiece zone 340 (e.g., workpiece receptacle 70), and an actuator 360 (e.g., actuator 56). The heat shield 320 is disposed between the induction welding coil 312 and the workpiece zone 340 in the first dimension 380. Similarly, the heat shield 320 is disposed between the workpiece zone 340 and supports 370a, 370b in the first dimension 380. The workpiece zone 340 is disposed between the heat shield 320 and the actuator 360 in the first dimension 380.

The heat shield 320 of the induction welding assembly 310 may be in accord with the heat shield 102a of FIG. 19A or the heat shield 102b of FIG. 19B. In this regard, the heat shield 320 includes a heat shield recess 322 on a first surface 328 of the heat shield 320. The heat shield recess 322 is concave relative to the first surface 328, and is collectively defined by a pair of sidewalls 324 and a base or bottom 326 that extends between the sidewalls 324. The heat shield recess 322 is aligned with and projects toward the induction coil 312. During an induction welding operation, the induction welding coil 312 will be at least partially disposed within the heat shield recess 322. Typically there will be at least some space between the induction welding coil 312 and the base 326 of the heat shield recess 322.

A workpiece 350 of any appropriate size, shape, configuration, and/or type may be disposed within the workpiece zone 340. The illustrated workpiece 350 includes a first workpiece member 352 and a second workpiece member 354 that are to be induction welded together (the noted optional heat management device 330 may be correspondingly-shaped with the workpiece 350). For instance, the first workpiece member 352 and the second workpiece member 354 may be thermoplastic structures. The workpiece 350 may be configured as a fan cowl for a nacelle of an aircraft propulsion system. The workpiece 350, however, may alternatively be configured as or may otherwise be included as part of another nacelle component, an aircraft control surface, a wing or an aircraft fuselage. However, the induction welding assembly 310 is not limited to induction welding and manufacturing such exemplary components or to aircraft propulsion system applications. For instance, the induction welding assembly 310 may be utilized for manufacturing any type or configuration of workpiece where two or more bodies (e.g., workpiece members) are joined together via induction welding.

The first support 370a engages the heat shield 320 on a first side of the heat shield recess 322, while the second support 370b engages the heat shield 320 on an opposite second side of the heat shield recess 322. The supports 370a, 370b may move toward and away from the heat shield 320 in the direction indicated by the corresponding double-headed arrow A in FIG. 20. The supports 370a, 370b may engage the heat shield 320 in proximity to the heat shield recess 322. In accordance with the discussion above regarding the heat shields 102a, 102b, the surface of the heat shield 320 engaged by the supports 370a, 370b (outside the heat shield recesses 300, 300', respectively) may be correspondingly-shaped with the interfacing surfaces of these supports 370a, 370b.

The actuator 360 provides a force in the direction indicated by the arrow B. This actuation force is opposed by the supports 370a, 370b engaging the heat shield 320 such that the first workpiece member 352 and the second workpiece member 354 are compressed between the heat shield 320 and the actuator 360 (the supports 370a, 370b remaining in a fixed position while engaging the heat shield 320), although one or more components may be disposed between the heat shield 320 and actuator 360 in the first dimension 380 (e.g., the heat management device 330; one or more intermediate structures could be disposed between the actuator 360 and the workpiece 350).

The heat shield 320 may also be characterized as a low thermal conductive/low heat capacity part to reduce the potential for the workpiece 350 cooling too rapidly). Moreover and as addressed below, the heat shield 320 may be characterized as being an electromagnetic (EM) transparent part.

There are a number of points of note regarding the induction welding assembly 310 of FIG. 20. The supports 370a, 370b engage the heat shield 320 at locations where the thickness of the heat shield 320 is greater than the thickness of the heat shield 320 within the heat shield recess 322. This enhances the structural integrity of the heat shield 320 during induction welding operations.

The heat shield recess 322 allows the induction welding coil 312 to be positioned closer to the workpiece 350 (compared to if a heat shield of uniform thickness is utilized; the heat shield recess 322 accommodates sufficient heat transfer for welding of the workpiece 350), and yet allows for the supports 370a, 370b to engage the heat shield 320 at locations of enhanced thickness (compared to the thickness of the heat shield 320 within the heat shield recess 322). Again, the supports 370a, 370b support the heat shield 320 as forces are transmitted to the heat shield 320 by the actuator 360 during induction welding operations.

In addition and as discussed above with regard to the heat shields 102a, 102b, the base 326 of the heat shield recess 322 may be correspondingly-shaped with and parallel to the surface of the heat shield 320 that interfaces with the optional heat management device 330 (or that interfaces directly with the workpiece 350, namely the first workpiece member 352). The thickness of the heat shield 320 within the heat shield recess 322 is then at least substantially constant proceeding along the length dimension of the heat shield recess 322 (into/out of the page in the view shown in FIG. 20; in the third dimension 384 shown in FIGS. 19A and 19B), which coincides with the direction of an induction welding operation. As such, the spacing between the induction coil 312 and the workpiece 350 being induction welded remains at least substantially constant as the induction coil 312 moves along the length dimension of the heat shield recess 322 during induction welding operations (into/out of the page in the view shown in FIG. 20; in the third dimension 384 shown in FIGS. 19A and 19B).

The heat shield 320 provides a number of benefits in relation to operation of the induction welding assembly 310 (these same benefits apply whether the heat shield 320 is in the form of the heat shield 102a (FIG. 19A) or the heat shield 102b (FIG. 19B)). One is that the heat shield 320 isolates the workpiece 350 (including the first workpiece member 352) from cooling an undesired amount during induction welding operations. Another is that the heat shield 320 reduces the potential of the supports 370a, 370b (e.g., trunks) from overheating during induction welding operations.

The heat shield 320 may be formed from mica (e.g., machined or milled from a sheet or block of a sufficient thickness), which provides a number of advantages for induction welding operations. One is that a mica heat shield 320 does not conduct electromagnetic fields, and thereby should not interfere with induction welding operations. Another is that a mica heat shield 320 tolerates the processing temperatures that are used in induction welding operations (e.g., a mica heat shield 320 is suitable for use in temperatures of at least 350° C.). Yet another is that a mica heat shield 320 with the heat shield recess 322 provides sufficient support for the workpiece 350 during induction welding operations (e.g., by the supports 370a, 370b engaging portions of the heat shield 320 having an enhanced thickness compared to within the heat shield recess 322, and by such a mica heat shield 320 having a high compressive strength, for instance to withstand a pressure of at least 90 psi). Other materials that are in accord with the foregoing (e.g., a sufficient tensile strength, machinability, availability in an appropriate thickness, transparent to electromagnetic fields) may be used for the heat shield 320.

Figure 21:
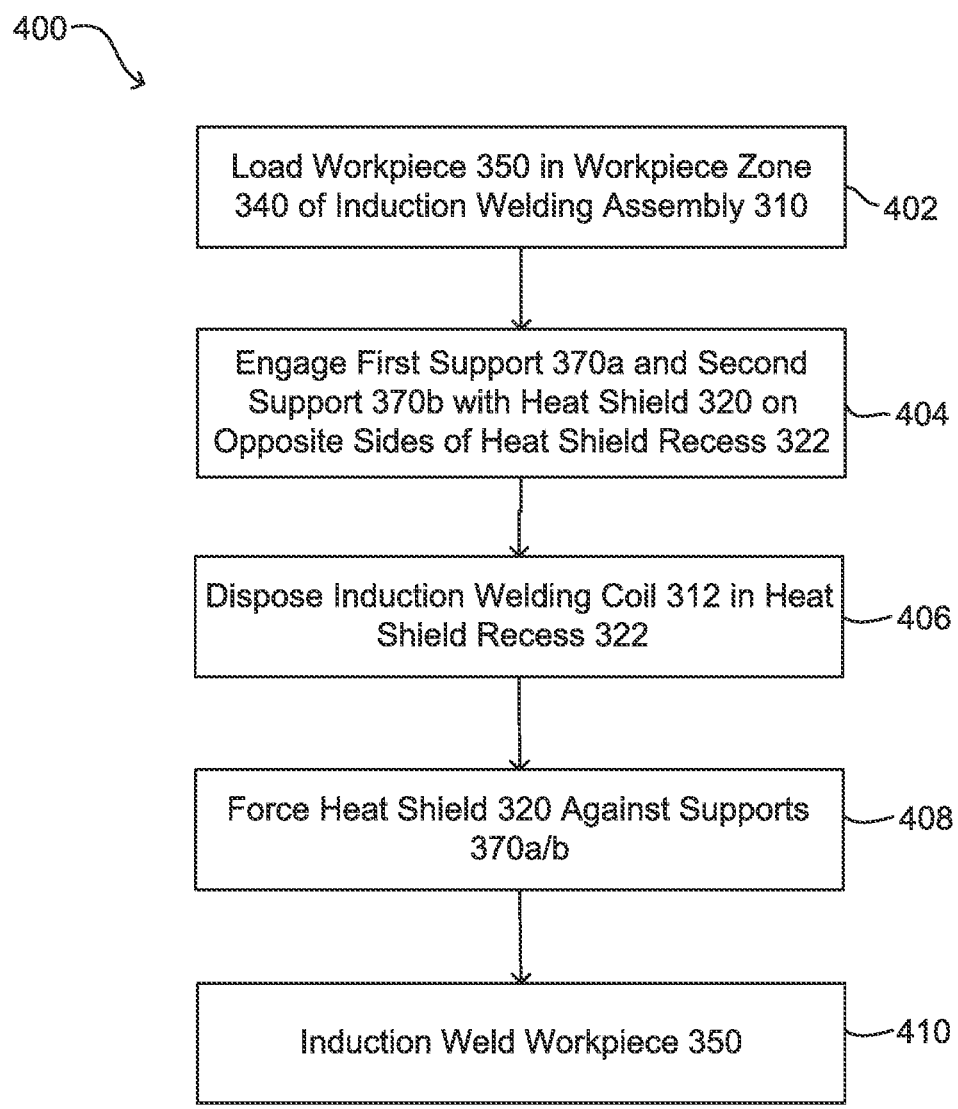
FIG. 21 is a flowchart that illustrates an induction welding method.

An induction welding operation or method is illustrated in FIG. 21, is identified by reference numeral 400, and will be addressed in relation to the induction welding assembly 310 of FIG. 20. A workpiece 350 is loaded in the workpiece zone 340 of the induction welding assembly 310 (402). The first support 370a engages the first surface 328 of the heat shield 320 on a first side of the heat shield recess 322, while the second support 370b engages the first surface 328 of the heat shield 320 on an opposite second side of the heat shield recess 322 (404). The locations where the supports 370a, 370b engage the heat shield 320 will be spaced in the second dimension 382.

The induction welding coil 312 may be moved relative to the heat shield 320 to position at least part of the induction welding coil 312 within the heat shield recess 322 (406). Typically the entirety of the induction welding coil 312 will be spaced from the base or bottom 326 of the heat shield recess 322 when the induction welding coil 312 is in position for induction welding.

The heat shield 320 may be forced against the supports 370a, 370b (408). For instance, the actuator 360 may be operated to exert a force on the workpiece 350 that is in the direction of the heat shield 320. This force may compress the workpiece 350 between the heat shield 320 and the actuator 360. Thereafter, the workpiece 350 may be induction welded in the manner described herein, and including via operation of the induction welding coil 312 (410).

Figure 22A:
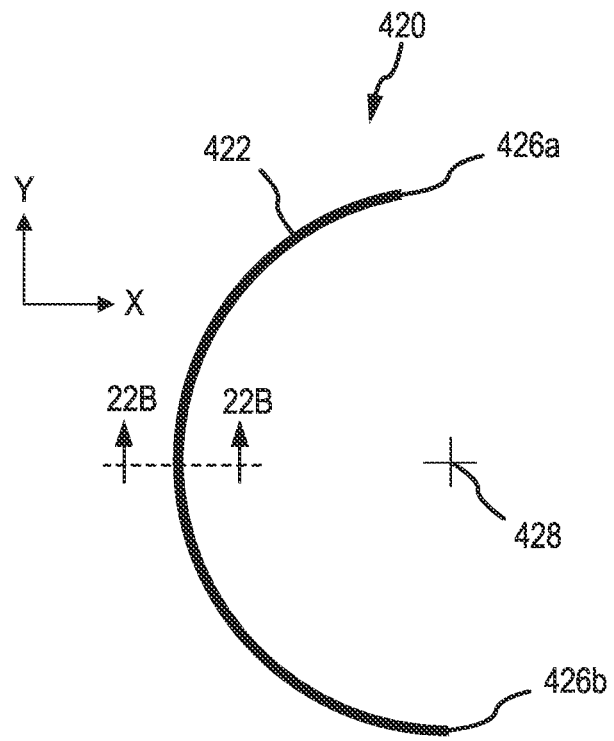
FIG. 22A illustrates a front-view profile of a stiffened panel half (such as for an aircraft nacelle fan cowl) having a semi-cylindrical geometry.

The induction welding assembly 310 of FIG. 20 again may be used to induction weld a first workpiece member 352 (e.g., a thermoplastic structure) to a second workpiece member 354 (e.g., a thermoplastic structure), for instance as at least part of the fabrication of a fan cowl for a nacelle of an aircraft propulsion system. A stiffened panel half or panel 420 for such a fan cowl is illustrated in FIG. 22A. The panel 420 may include an outer skin 422. The outer skin 422 may be made from a fiber-reinforced thermoplastic material. In various embodiments, the outer skin 422 includes a continuous reinforcing fiber and a thermoplastic resin. Any appropriate reinforcing fiber may be utilized for the outer skin 422. In any case, the outer skin 422 may have a semi-cylindrical geometry when viewed from the aft direction, extending from an edge 426a to an edge 426b and as shown in the illustrated embodiment. The outer skin 422 may define a centerline axis 428. Stated differently, the outer skin 422 may be bent or curved around/about the centerline axis 428 (e.g., extending 1800 about the centerline axis 428).

Figure 22B:
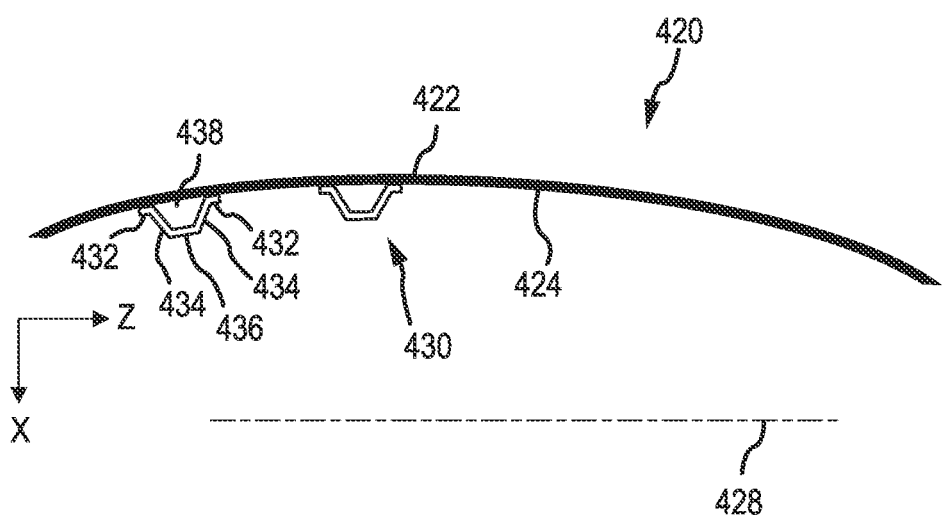
FIG. 22B illustrates a section view of the panel half of FIG. 22A having a rounded geometry.

A section view of the panel 420 is illustrated in FIG. 22B. The outer skin 422 may be contoured along the longitudinal direction (i.e., the Z-direction). Stated differently, the outer skin 422 may have a non-linear geometry (e.g., curved or rounded) proceeding along a longitudinal direction of the outer skin 422 (the centerline axis 428 extending in the longitudinal direction). One or more ribs or stiffeners 430 may be mounted to an inner surface 424 of the outer skin 422 (not shown in FIG. 22A; each stiffener 430 being separately formed from the outer skin 422). The length dimension of each stiffener 430 may extend between the edges 426a, 426b of the outer skin 422 (e.g., the length dimension of each stiffener 430 may extend 180° about the centerline axis 428, although each stiffener 430 may be of any appropriate arcuate extent about the centerline axis 428). Each stiffener 430 may be of any appropriate configuration (e.g., hat-shaped as shown in FIG. 22B; Z-shaped; C-shaped). Multiple stiffeners 430 may be spaced along the centerline axis 428. Any appropriate number of stiffeners 430 may be utilized by the panel 420, including one or more stiffeners 430.

Figure 23A:
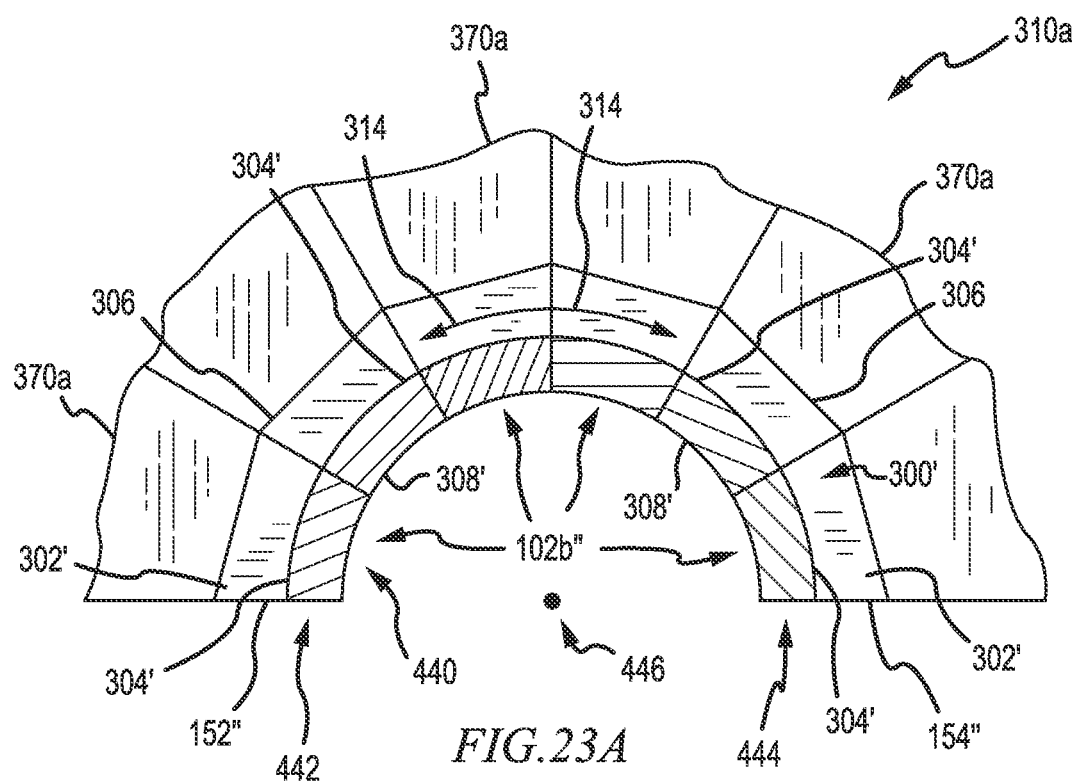
FIG. 23A is a cross-sectional view of an induction welding assembly that utilizes a plurality of heat shields arranged for movement of an induction welding coil along a curved welding path.

FIG. 23A illustrates an induction welding assembly that is a variation of the induction welding assembly 310 of FIG. 20 and that is identified by reference numeral 310a. The primary difference between the induction welding assembly 310a of FIG. 23A and the induction welding assembly 310 of FIG. 20 is that the induction welding assembly 310a of FIG. 23A utilizes a plurality of heat shields 102b'' (where each such heat shield 102b'' is a variation of the heat shield 102b of FIGS. 19B and 19C) to accommodate induction welding a stiffener (e.g., stiffener 430—FIG. 22B) onto a curved skin or shell (e.g., outer skin 422—FIGS. 22A and 22B). The discussion presented above regarding the induction welding assembly 310 of FIG. 20 remains equally applicable to the induction welding assembly 310a of FIG. 23A unless otherwise noted to the contrary herein. Moreover, corresponding components between the heat shield 102b of FIGS. 19B and 19C and the heat shields 102b'' of FIG. 23A are identified by the same reference numbers, and unless otherwise noted to the contrary herein, the discussion presented above with regard to these corresponding components remains equally applicable.

The cross section presented in FIG. 23A is of a view taken along the length dimension of the heat shield recess 300' of the heat shields 102b'' (e.g., along X-X in FIG. 20, but where the heat shield 320 in FIG. 20 is in the form of the heat shields 102b'' presented in FIG. 23A). As the heat shield ends 152'', 154'' of the heat shields 102b'' are not perpendicular to the first surface 306 of the heat shield 102b'', a "double prime" designation is used in FIG. 23A. This is the primary difference between the heat shields 102b'' of FIG. 23A and the heat shield 102b of FIGS. 19B and 19C. That is, the heat shield ends 152'', 154'' are "angled" to accommodate a positioning of the multiple heat shields 102b'' in a manner discussed below.

As noted above, the base 304' of the heat shield recess 300' for the heat shield 102b'' is curved proceeding from the first heat shield end 152'' to the second heat shield end 154'' (e.g., the base 304' is curved proceeding in the third dimension 384; the base 304' may be characterized as being a convex surface or convex proceeding in the third dimension 384). The base 304' of the heat shield recess 300' could be configured so as to not be curved in the second dimension 382 (e.g., the base 304' could be cylindrical). Similarly, the second surface 308' of the heat shield 102b'' is curved proceeding from the first heat shield end 152'' to the second heat shield end 154'' (e.g., the second surface 308' is curved proceeding in the third dimension 384; the second surface 308' may be characterized as being a concave surface or concave proceeding in the third dimension 384). The second surface 308' of the heat shield 102b'' could be configured so as to not be curved in the second dimension 382 (e.g., the second surface 308' could be cylindrical). The base 304' of the heat shield recess 300' may be correspondingly-shaped with second surface 308' of the heat shield 102b'', including where the base 304' of the heat shield recess 300' is at least substantially parallel to the second surface 308' of the heat shield 102b'' (e.g., a curvature of the base 304' may match a curvature of the second surface 308' of the heat shield 102b'').

The heat shields 102b'' are at least generally aligned or disposed in end-to-end relation for the case of the induction welding assembly 310a presented in FIG. 23A. In the case of adjacently-disposed heat shields 102b'', a first heat shield end 152'' of one of these heat shields 102b'' may be disposed in closely-spaced relation to or engaged with a second heat shield end 154'' of the adjacently-disposed heat shields 102b''. In any case, the plurality of heat shields 102b'' may be characterized as a heat shield assembly 440. Any appropriate number of heat shields 102b'' may be used by the heat shield assembly 440. Although adjacently-disposed first supports 370a are illustrated as being engaged, such need not be the case. Moreover, a single first support 370a could be configured to engage the corresponding portion of the first surface 306 of multiple heat shields 102b''.

The length dimension of the heat shield assembly 440 may be characterized as the spacing between a first end 442 of the heat shield assembly 440 (corresponding with the first heat shield end 152'' of the heat shield 102b'' at this first end 442) and a second end 444 of the heat shield assembly 440 (corresponding with the second heat shield end 154'' of the heat shield 102b'' at this second end 444), where this length dimension proceeds about a reference axis 446 (e.g., the reference axis 446 may extend in the third dimension 384). The heat shield assembly 440 may be of any appropriate length proceeding about this reference axis 446. For instance, the length dimension of the heat shield assembly 440 may extend 180° about the reference axis 446, although other angular extents ("angular" meaning about the axis 446) of the heat shield assembly 440 may be utilized as desired/required.

The bases 304' of the heat shield recesses 300' of the heat shields 102b'' of the heat shield assembly 440 may collectively extend about the above-noted reference axis 446, including where these bases 304' collectively define an at least substantially continuous surface that curves proceeding about reference axis 446 (and including at a constant radius relative to this reference axis 446). The second surface 308' of each heat shield 102b" of the heat shield assembly 440 may collectively extend about the reference axis 446, including where these second surfaces 308' collectively define an at least substantially continuous surface that curves proceeding about reference axis 446 (and including at a constant radius relative to this reference axis 446). The second surface 308' of each heat shield 102b" may be correspondingly-shaped with a corresponding portion of the outer skin 422 of the panel 420 (FIGS. 22A and 22B) for induction welding operations by the induction welding assembly 310a.

The induction welding coil 312 (FIG. 20) moves along a curved welding path 314 during induction welding operations using the induction welding assembly 310a of FIG. 23A (the induction welding coil 312 may move in either direction along this curved welding path 314 during induction welding operations). This curved welding path 314 may also proceed about the above-noted reference axis 446, including where the curved welding path 314 is defined by a fixed radius extending from the reference axis 446. The base 304' of each heat shield 102b" may be at least substantially parallel with the noted curved welding path 314. In any case, the induction welding coil 312 may remain at an at least substantially common, fixed distance from the bases 304' of the heat shield recesses 300' for the heat shields 102b" as the induction welding coil 312 moves along the curved welding path 314 (e.g., proceeding from the first end 442 of the heat shield assembly 440 to the second end 444 of the heat shield assembly 440, or vice versa).

The induction welding assembly 310a of FIG. 23A may be used to induction weld one or more stiffeners 430 (FIG. 22B) to the inner surface 424 of the outer skin 422 (FIG. 22B). Referring back to FIG. 22B, the stiffener 430 includes a pair of flanges 432. A sidewall 434 of the stiffener 430 extends between each of its flanges 432 and an end wall 436 of the stiffener 430. The stiffener 430 thereby includes a hollow interior 438 that is collectively defined by the two sidewalls 434 and the end wall 436.

Each flange 432 of the stiffener 430 may be induction welded to the inner surface 424 of the outer skin 422 (FIG. 22B) by the induction welding assembly 310a (FIG. 23A). The stiffener 430 (e.g., a second workpiece member 354—FIG. 20) and panel 420 (e.g., a first workpiece member 352—FIG. 20) may be positioned relative to the induction welding assembly 310a such that the centerline axis 428 (FIGS. 22A and 22B) is colinear with or parallel to the reference axis 446 associated with the heat shield assembly 440 of the induction welding assembly 310a. One of the flanges 432 would be aligned with at least one heat shield recess 300' of the heat shield assembly 440, the induction welding coil 312 (FIG. 20) of the induction welding assembly 310a would be directed into the aligned heat shield recess 300' of at least one heat shield 102b", and the induction welding coil 312 would be moved along the curved welding path 314 (and along/within the various heat shield recesses 300') to induction weld the noted flange 432 to the inner surface 424 of the outer skin 422. Movement of the induction welding coil 312 along the curved welding path 314 may be terminated once the flange 432 of the stiffener 430 has been induction welded to the inner surface 424 of the outer skin 422 to the desired extent, the induction welding coil 312 may be moved away from the heat shield assembly 440 (such that the induction welding coil 312 does not extend into the heat shield recess 300' of any of the heat shields 102b"), and the induction welding assembly 310a may be repositioned relative to the stiffener 430 and panel 420 to align the other flange 432 of the stiffener 430 with at least one heat shield recess 300' of the heat shield assembly 440 of the induction welding assembly 310a. This second flange 432 of the stiffener 430 may then be induction welded to the inner surface 424 of the outer skin 422 in accordance with the foregoing.

Figure 23B:
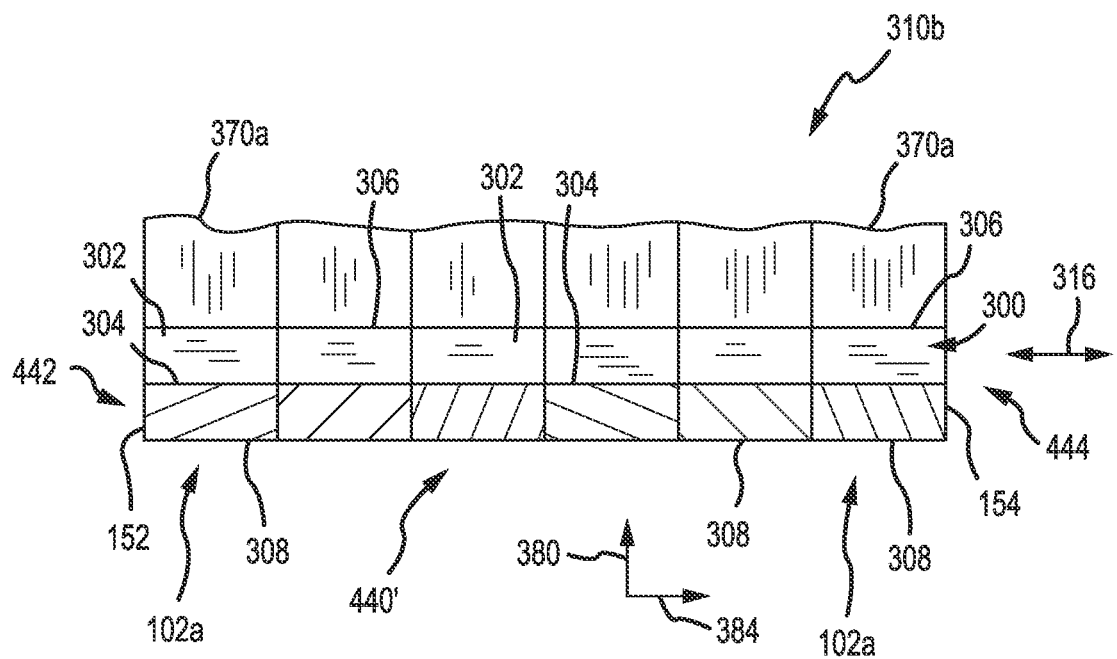
FIG. 23B is a cross-sectional view of an induction welding assembly that utilizes a plurality of heat shields arranged for movement of an induction welding coil along an axial welding path.

FIG. 23B illustrates an induction welding assembly that is a variation of the induction welding assembly 310 of FIG. 20 and that is identified by reference numeral 310b. The primary difference between the induction welding assembly 310a of FIG. 23B and the induction welding assembly 310 of FIG. 20 is that the induction welding assembly 310b of FIG. 23B utilizes a plurality of heat shields 102b (FIG. 19A) to accommodate induction welding the first workpiece member 352 to the second workpiece member 354. The discussion presented above regarding the induction welding assembly 310 of FIG. 20 remains equally applicable to the induction welding assembly 310b of FIG. 23B unless otherwise noted to the contrary herein.

The cross section presented in FIG. 23B is of a view taken along the length dimension of the heat shield recess 300 of the heat shields 102a (e.g., along X-X in FIG. 20, but where the heat shield 320 in FIG. 20 is in the form of the heat shields 102a presented in FIG. 23B). The heat shields 102a are at least generally aligned or disposed in end-to-end relation for the case of the induction welding assembly 310b presented in FIG. 23B. In the case of adjacently-disposed heat shields 102a, a first heat shield end 152 of one of these heat shields 102a may be disposed in closely-spaced relation to or engaged with a second heat shield end 154 of the adjacently-disposed heat shields 102a. In any case, the plurality of heat shields 102a may be characterized as a heat shield assembly 440'. Any appropriate number of heat shields 102a may be used by the heat shield assembly 440'. Although adjacently-disposed first supports 370a are illustrated as being engaged, such need not be the case. Moreover, a single first support 370a could be configured to engage the corresponding portion of the first surface 306 of multiple heat shields 102a.

The length dimension of the heat shield assembly 440' may be characterized as the spacing between a first end 442 of the heat shield assembly 440 (corresponding with the first heat shield end 152 of the heat shield 102a at this first end 442) and a second end 444 of the heat shield assembly 440' (corresponding with the second heat shield end 154 of the heat shield 102a at this second end 444), where this length dimension coincides with the third dimension 384. The heat shield assembly 440' may be of any appropriate length in the third dimension 384.

As noted above, the base 304 of the heat shield recess 300 is flat or planar. The bases 304 of the heat shield recesses 300 of the heat shields 102a of the heat shield assembly 440' may be aligned for their respective lengths to collectively extend in the third dimension 384. The bases 304 of the various heat shields 102a may collectively define an at least substantially continuous surface that is flat or planar.

The induction welding coil 312 (FIG. 20) moves along an axial or linear welding path 316 during induction welding operations using the induction welding assembly 310b of FIG. 23B (the induction welding coil 312 may move in either direction along this axial welding path 316 during induction welding operations). This axial welding path 316 may extend in the third dimension 384. The induction welding coil 312 may remain at an at least substantially common fixed distance from the bases 304 of the heat shield recesses 300 for the heat shields 102a as the induction welding coil 312 moves along the axial welding path 316 (e.g., proceeding from the first end 442 of the heat shield assembly 440' to the second end 444 of the heat shield assembly 440', or vice versa).

Figure 24:
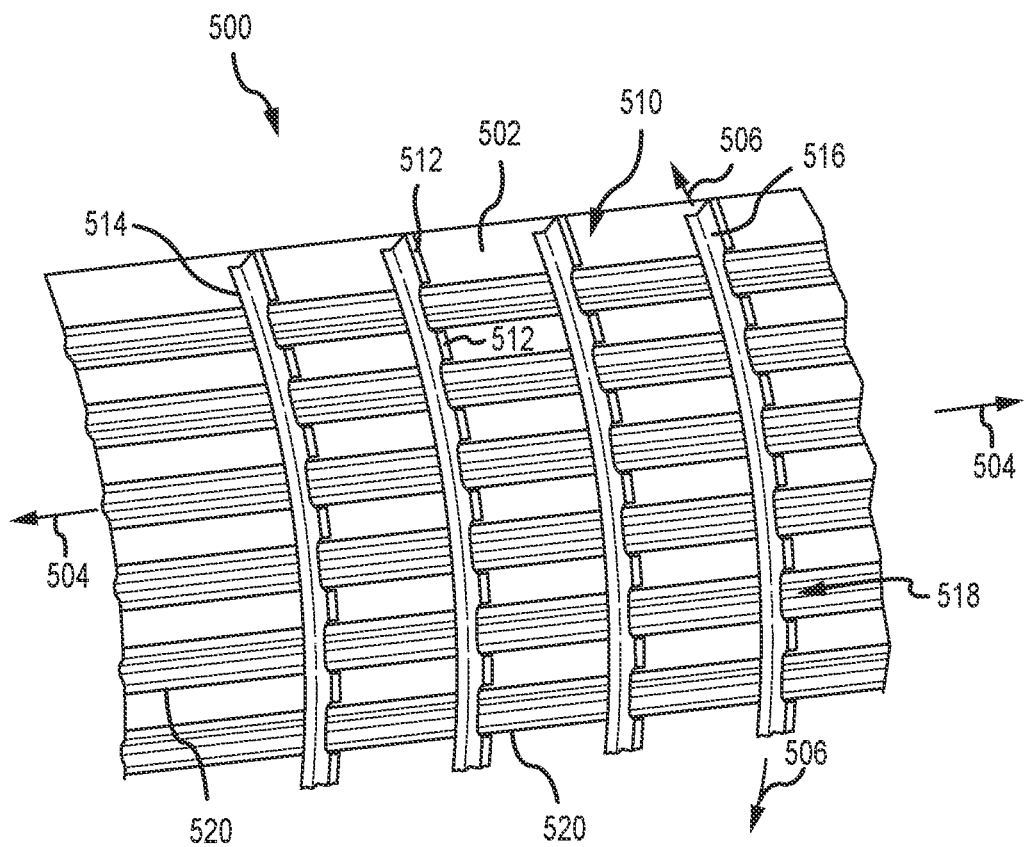
FIG. 24 is a perspective view of an interior of a panel that includes an outer skin, a plurality of first stiffeners, and a plurality of second stiffeners.
Figure 26:
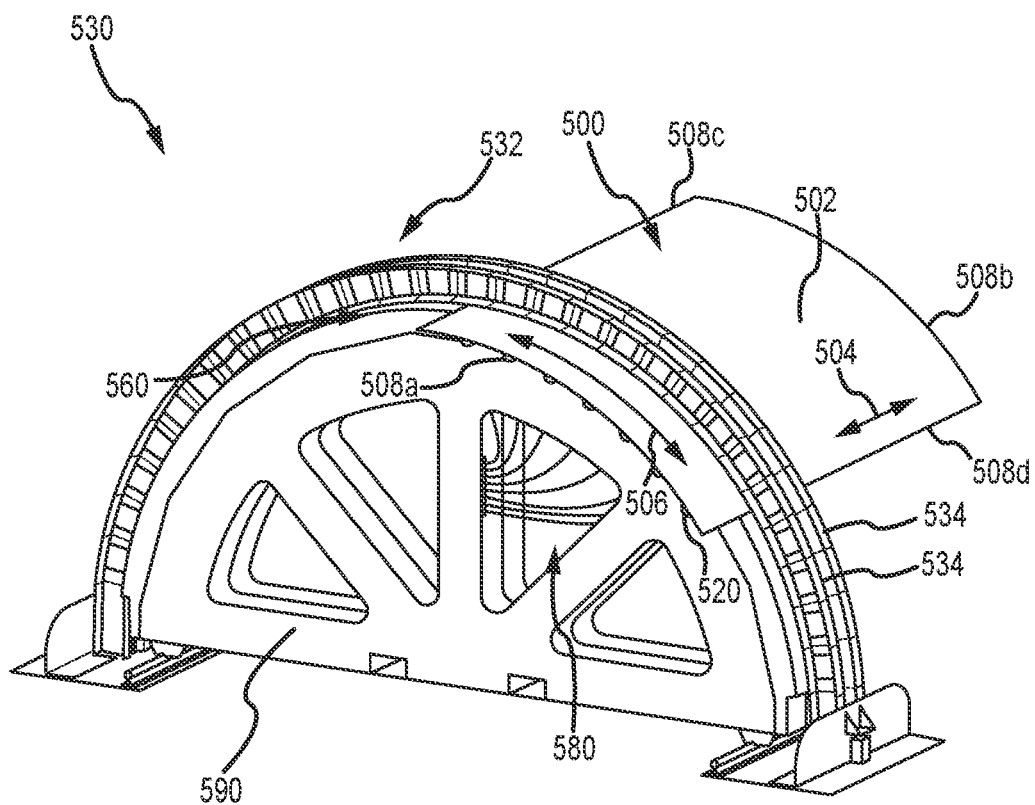
FIG. 26 is a perspective view of the welding assembly of FIG. 25 with the outer skin and second stiffeners of the panel of FIG. 24 being disposed in a workpiece zone of the welding assembly.
Figure 27:
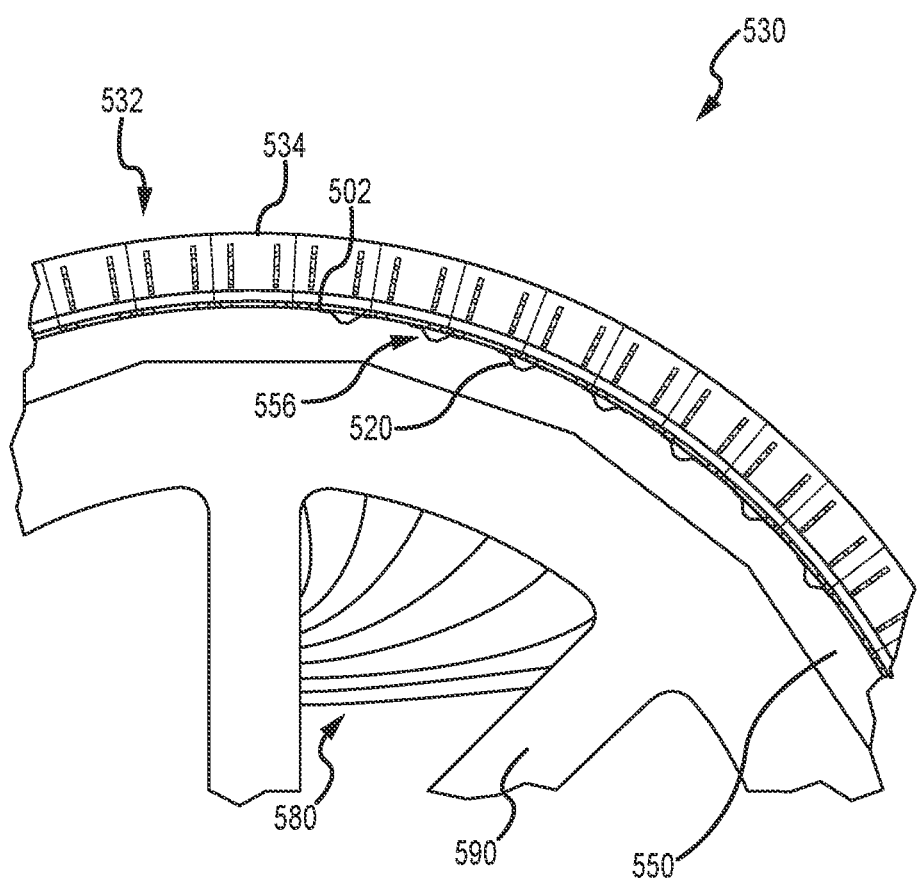
FIG. 27 is an end view of the welding assembly of FIG. 26.

An interior of a portion of a panel is illustrated in FIG. 24 and is identified by reference numeral 500. The panel 500 may be utilized for various aircraft applications, such as for a fuselage of an aircraft, for a nacelle of an aircraft, (e.g., a nacelle for an aircraft engine), or the like. Referring to both FIGS. 24 and 26, the panel 500 includes an outer skin 502 (e.g., a thermoplastic composite) having its length (e.g., a spacing between a fore end 508a and an aft end 508b of the panel 500) extending in a second dimension 504 (e.g., the "z" dimension shown in FIGS. 22A and 22B) and with the outer skin 502 being curved in a first or circumferential dimension 506 (e.g., the panel 500/outer skin 502 including edges 508c, 508d (e.g., at least generally corresponding to edges 426a, 426b shown in FIG. 22A), and with the panel 500/outer skin 502 being curved in the first/circumferential dimension (e.g., proceeding from edge 508c to edge 508d and/or proceeding about a centerline axis corresponding to the centerline axis 428 shown in FIGS. 22A and 22B (such a centerline axis corresponding with a length dimension for the panel 500/outer skin 502)). The panel 500/outer skin 502 could also be curved proceeding along its length dimension (for instance, in accord with FIG. 22B).

The panel 500 includes a plurality of second stiffeners 520 (e.g., a thermoplastic composite) that are each appropriately attached/mounted (e.g., induction welded) to the interior of the outer skin 502. The plurality of second stiffeners 520 are disposed in at least substantially parallel relation to one another. The second stiffeners 520 are spaced from one another (e.g., equally) in the first/circumferential dimension 506. A length dimension of each second stiffener 520 extends in the second dimension 504.

The panel 500 further includes a plurality of first stiffeners 510 (e.g., a thermoplastic composite) that are each appropriately attached/mounted (e.g., induction welded) to the interior of the outer skin 502. The plurality of first stiffeners 510 are disposed in at least substantially parallel relation to one another. The first stiffeners 510 are spaced from one another (e.g., equally) in the second dimension 504. A length dimension of each first stiffener 520 extends in the first/circumferential dimension 504. Each second stiffener 520 extends through a plurality of first stiffeners 510 proceeding along the corresponding length dimension of a particular second stiffener 520.

Figure 24A:
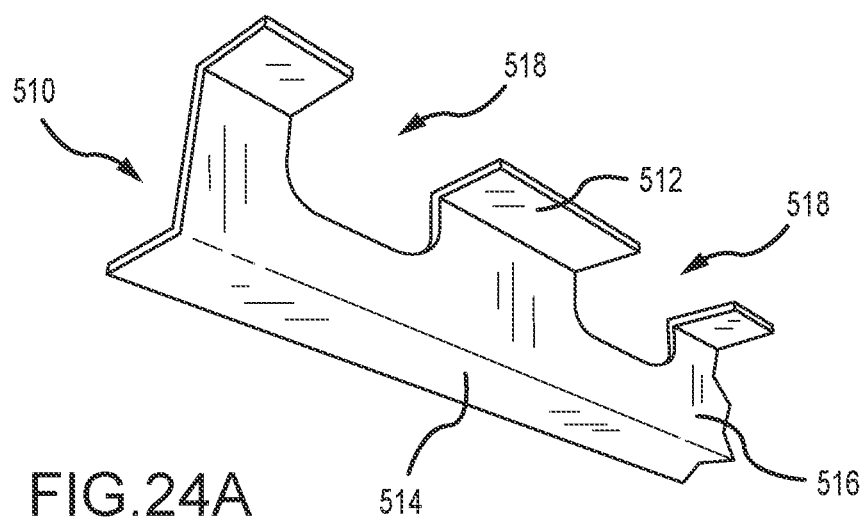
FIG. 24A is a perspective view of a portion of one of the first stiffeners shown in FIG. 24.
Figure 25:
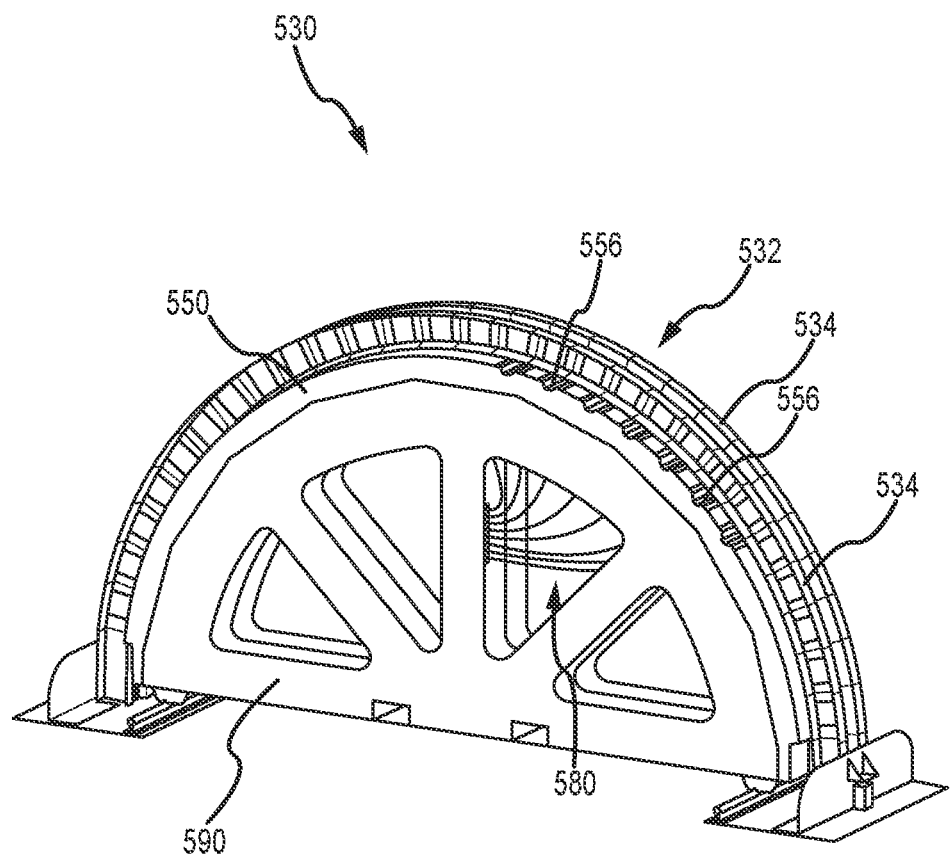
FIG. 25 is a perspective view of a welding assembly that may be used to weld at least the first stiffeners to the outer skin for the panel of FIG. 24.
Figure 29:
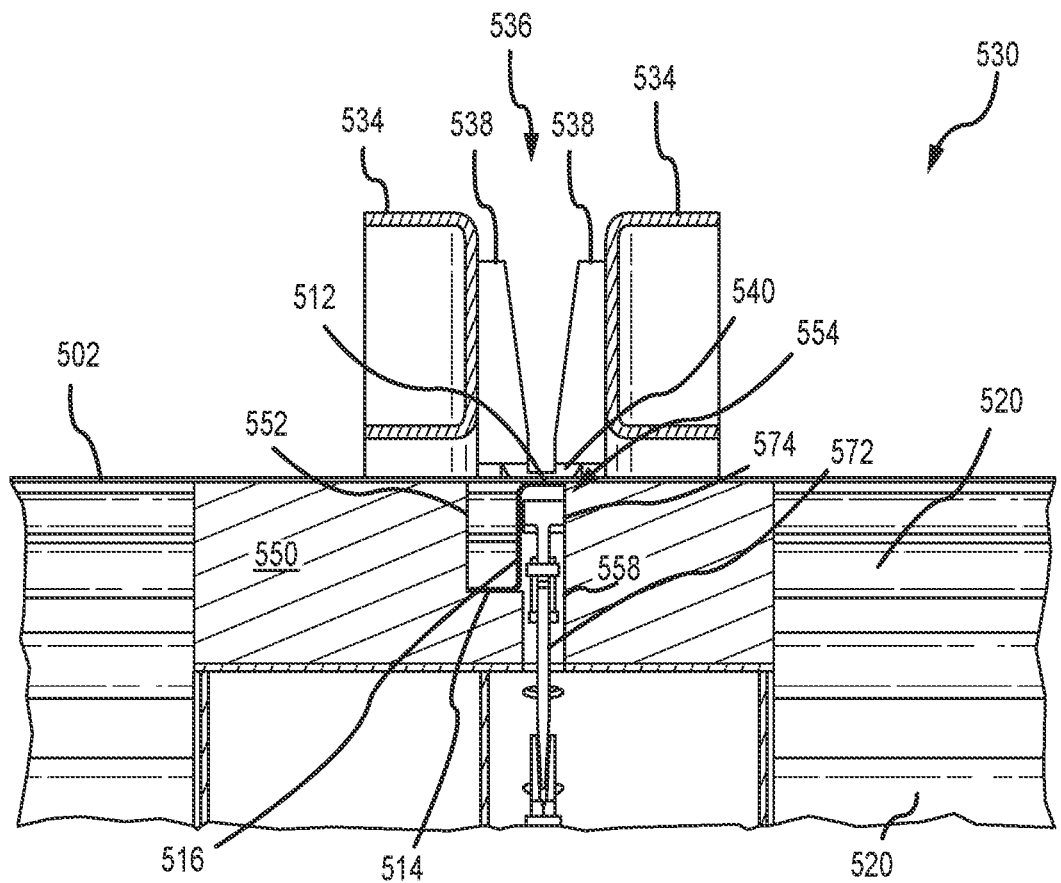
FIG. 29 is an enlarged cutaway view showing one of the first stiffeners in position for welding of its first flange to the outer skin for the panel of FIG. 24.

The profile of the first stiffeners 510 is shown in FIGS. 24, 24A, and 29. The first stiffeners 510 may be characterized as being at least generally Z-shaped in cross section. In any case, each first stiffener 510 has a plurality of first flanges 512, a second flange 514, and an intermediate section 516 extending between the first flanges 512 and the second flange 514. The first flanges 512 of each first stiffener 510 are what is attached/mounted to the outer skin 502 of the panel 500 (e.g., via induction welding). In the view of FIG. 24A, the shaded surface of the first flanges 512 that are shown is the surface opposite that which interfaces with the outer skin 502. Each first stiffener 510 includes a plurality of pockets/cutouts/receptacles 518 that are spaced from one another proceeding along the length dimension of the corresponding first stiffener 510 (coinciding with the first/circumferential dimension 506) such that the plurality of first flanges 512 are also spaced from one another proceeding along the length dimension of the corresponding first stiffener 510. Each pocket 518 of each first stiffener 510 receives a different one of the plurality second stiffeners 520. Each first flange 512 of a first stiffener 510 is disposed between a different adjacent pair of second stiffeners 520.

A welding assembly is illustrated in FIGS. 25-29 and is identified by reference numeral 530. The welding assembly 530 may be an induction welding assembly at least generally in accordance with the foregoing (including the induction welding assembly 310 of FIG. 20), where the induction welding coil may be more generally referred to as a welding head for the case of the welding assembly 530. Generally, the welding assembly 530 may be used to weld the outer skin 502 of the panel 500 to each of the first flanges 512 for the various first stiffeners 510 shown in FIG. 24.

The welding assembly 530 includes a first support 532, a tooling block 550, and a second support 590, with the tooling block 550 being disposed between the first support 532 and the second support 590. A workpiece zone 560 is disposed/located between the first support 532 and the tooling block 550. The first support 532 includes a pair of beams 534 that are spaced from one another in the second dimension 504. The tooling block 556 includes a plurality of concave receptacles 556, with each receptacle 556 receiving a different second stiffener 520.

Figure 28:
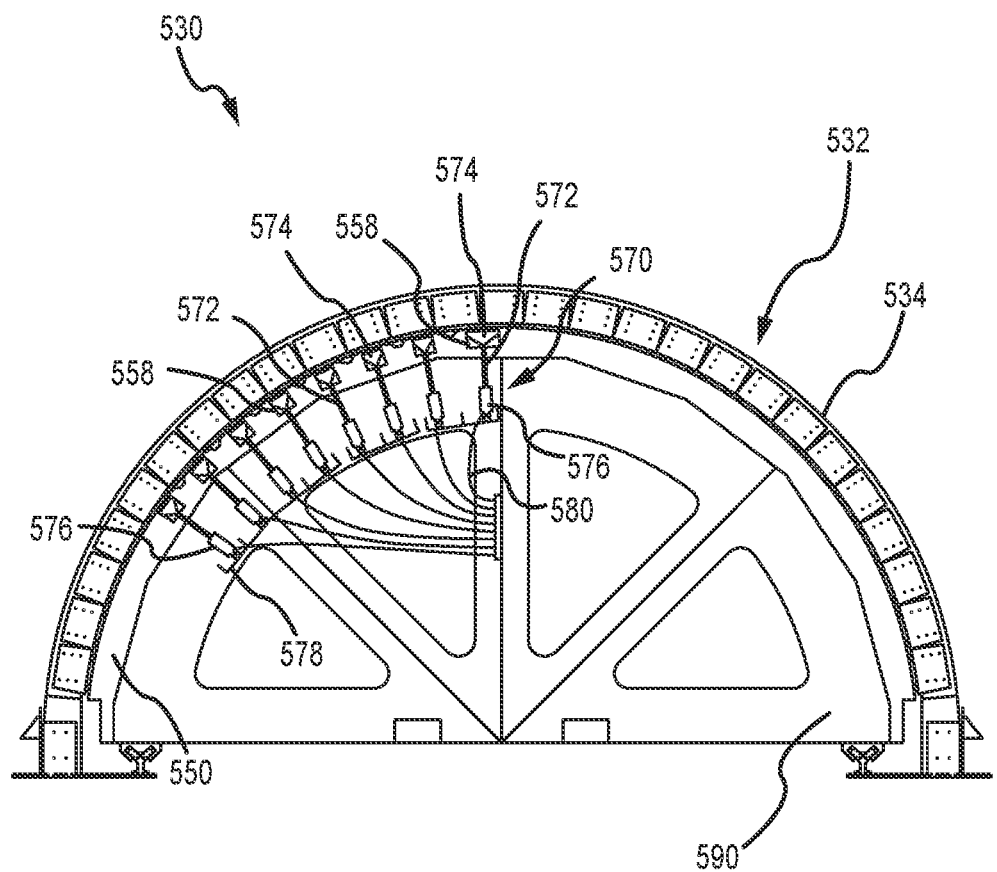
FIG. 28 is a cutaway view of the welding assembly of FIG. 26 to illustrate a plurality of actuators that press flanges of the first stiffener against the outer skin of the panel of FIG. 24 during a welding operation.
Figure 28A:
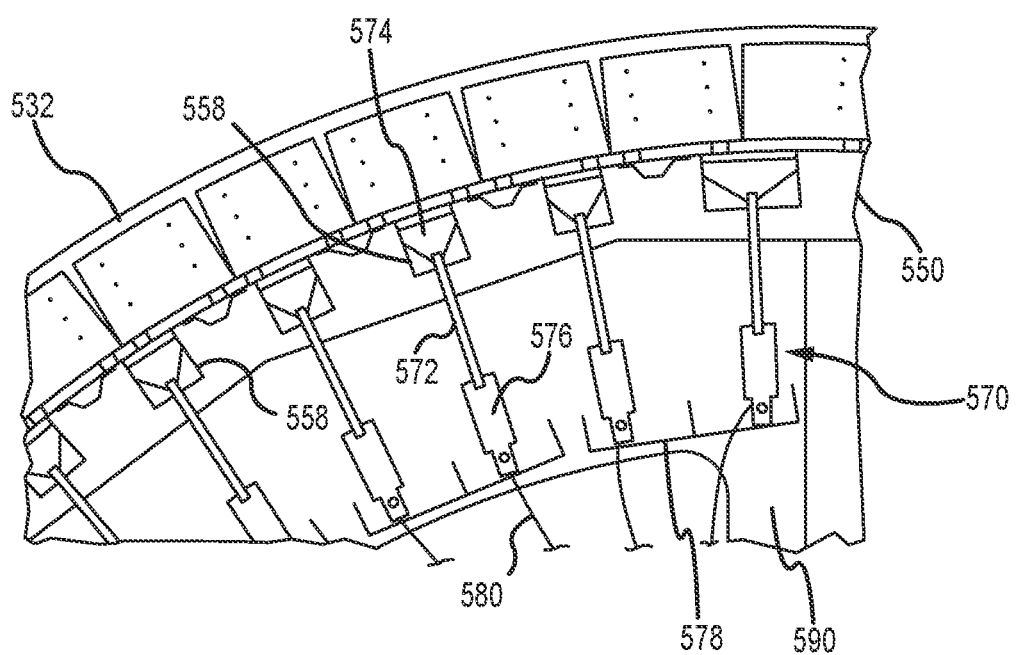
FIG. 28A is an enlarged view of a portion of the welding assembly of FIG. 28.

The welding assembly 530 includes a plurality of actuators 570 (e.g., FIGS. 28, 28A, and 29). The actuators 570 may be of any appropriate size, shape, configuration and/or type, for instance pneumatic or hydraulic, with pneumatic actuators 570 currently being more preferred for induction welding of thermoplastic composites (e.g., induction welding of the first flanges 512 of the first stiffeners 510 to the interior of the outer skin 502). Each actuator 570 includes a body or cylinder 576, a ram 572 (e.g., a workpiece retention ram 572) that moves (e.g., axially) relative to the body 576 when actuated, a head 574 incorporated by a distal end of the ram 572, and an actuation fluid line 580 that extends from an appropriate actuation fluid source (not shown) to the body 576 of the actuator 570. The head 574 of the actuators 570 may be correspondingly sized/shaped for engagement with the corresponding first flange 512 of the first stiffener 510. The welding assembly 530 may include one or more mounting plates 578 that may be mounted to the second support 590, and with the body 576 of each actuator 570 being appropriately secured relative to a mounting plate 578. A given mounting plate 578 may be used to anchor one or more actuators 570 relative to the second support 590.

The actuators 570 of the welding assembly 530 are spaced from one another proceeding along the first/circumferential dimension 506, including their corresponding rams 572. The tooling block 550 may include a plurality of receptacles 558 (FIGS. 28, 28A, and 29) that are spaced from one another proceeding along the first/circumferential dimension 506. Each receptacle 558 movably receives a head 574 of a different actuator 570. Actuation of each actuator 570 moves its corresponding ram 572 and associated head 574 along an axial path relative to each of the tooling block 550 and the corresponding first flange 512 for a given first stiffener 510.

FIG. 29 presents an enlarged view for the welding of the outer skin 502 to one of the first flanges 512 of a corresponding first stiffener 510. The first support 532 includes the above-noted pair of beams 534 that are spaced from one another in the second dimension 504 to define an inter-beam channel 536. The first support 532 further includes a pair of trunks 538 that are disposed within this inter-beam channel 536 and that are movable toward/away from a heat shield 540. The heat shield 540 may be in accordance with the heat shield(s) 102b, 102b''' addressed above. An induction welding coil (e.g., induction welding coil 312—FIG. 20) may be directed into the recess of the heat shield 540 shown in FIG. 29 for induction welding operations.

The tooling block 550 includes a plurality of first stiffener receptacles 552 (FIG. 28A) that are spaced from one another proceeding along the first/circumferential dimension 506. Each first stiffener receptacle 552 receives a different one of the plurality of first stiffeners 510. The first flange 512 of the first stiffener 510 may be disposed against/in proximity to the interior of the outer skin 502 and in alignment with the heat shield 540 (and including in alignment with any recess utilized by the heat shield 540). One or more heat management devices 540 may be disposed between the first flange 512 of the first stiffener 510 and the head 574 of actuator 570. The actuator 570 may be actuated to move the ram 572 in the direction of the first flange 512 such that its corresponding head 574 exerts an axial force on the first flange 512 (directly or indirectly (via the one or more heat management devices 554)). As the trunks 538 engage the heat shield 540, the outer skin 502 and the first flange 512 of the first stiffener 510 are compressed between the heat shield 540 and the head 574 of the actuator 570. An induction welding coil (e.g., induction welding coil 312—FIG. 20) may be disposed in the recess of the heat shield 540 to induction weld the first flange 512 to the outer skin 502. At this time, the ram 527 of the actuator 570 will be aligned with both the first flange 512 and the induction welding coil.

Each first flange 512 of a given first stiffener 510 may be induction welded to the outer skin 502 in accordance with the foregoing. After one of the first flanges 512 of a given first stiffener 510 has been induction welded to the outer skin 502, the induction welding coil (e.g. induction welding coil 312 of FIG. 20) may be moved away from the heat shield 540, and in any case may be moved relative to the first support 532 (e.g., in the first/circumferential dimension 506) into alignment with a different first flange 512 of the same first stiffener 510 for welding of this additional first flange 512 to the outer skin 502 and in accordance with the foregoing.

Based upon the foregoing, it should be appreciated that the welding assembly 530 enables discrete pressure loading along weld lines that may have non-continuous sections (e.g., the spacing between adjacent pairs of first flange is of the first stiffener 510. In addition, the welding assembly 530 is customizable in terms of geometry and process and the ram 572 of each actuator 570 can be controlled separately. In this regard, the welding assembly 530 could be configured such that the ram 572 for the first flange 512 that is being welded is in an actuated state, while one or more of the other rams 572 (including all other rams 572) remain in an un-actuated state. The welding assembly 530 would also allow different rams 572 to exert different pressures on their corresponding first flanges 510. For instance the ram 572 for the first flange 512 that is being welded could be applying a first pressure, and other of the rams 572 could be actuated but in a manner that generates a different pressure on their corresponding first flange 512 (e.g., of a smaller magnitude than the noted first pressure).

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A welding assembly, comprising:
   a first support;
   a tooling block spaced from said first support;
   a plurality of workpiece retention rams incorporated by said tooling block and that are spaced from one another proceeding along a first dimension;
   a workpiece zone disposed between said first support and said tooling block; and
   a welding head, wherein said workpiece zone is disposed between said welding head and said tooling block, wherein each workpiece retention ram of said plurality of workpiece retention rams is movable in a direction of said workpiece zone and said first support, and wherein said welding head is movable relative to first support and separately into alignment with each said workpiece retention ram of said plurality of workpiece retention rams for a separate welding operation.

2. The welding assembly of claim 1, wherein said welding head comprises an induction welding coil.

3. The welding assembly of claim 1, wherein for each said welding operation said welding head is aligned with only one of said plurality of workpiece retention rams.

4. The welding assembly of claim 1, further comprising:
   a first configuration where a first workpiece retention ram of said plurality of workpiece retention rams is configured to exert a force along a first axis that is aligned with said welding head when in a first position relative to said first support; and
   a second configuration where a second workpiece retention ram of said plurality of workpiece retention rams is configured to exert a force along a second axis that is aligned with said welding head when in a second position relative to said first support, wherein said first workpiece retention ram is spaced from said second workpiece retention ram proceeding along said first dimension, and wherein said first position of said welding head is also spaced from said second position of said welding head proceeding along said first dimension.

5. The welding assembly of claim 1, further comprising:
   a plurality of actuators, wherein each actuator of said plurality of actuators comprises a different one of said plurality of workpiece retention rams.

6. The welding assembly of claim 1, wherein said plurality of workpiece retention rams are equally spaced from one another proceeding along said first dimension.

7. The welding assembly of claim 1, wherein said tooling block comprises a plurality of receptacles that are spaced from one another proceeding along said first dimension, wherein at least an end portion of each of said plurality of workpiece retention rams is disposed in a different one of said plurality of receptacles.

8. The welding assembly of claim 1, wherein said workpiece zone comprises:
   an outer skin; and
   a first stiffener comprising a plurality of flanges that are spaced from one another proceeding along said first dimension, wherein a length dimension of said first stiffener extends in said first dimension.

9. The welding assembly of claim 8, wherein each of said plurality of flanges of said first stiffener is aligned with a different one of said plurality of workpiece retention rams, and wherein each of said plurality of workpiece retention rams compresses its corresponding said flange against said outer skin for a corresponding said welding operation using said welding head.

10. The welding assembly of claim 8, wherein said first stiffener comprises a plurality of pockets that are spaced along said length dimension of said first stiffener, said welding assembly further comprising a plurality of second stiffeners that are attached to said outer skin, and wherein each of said plurality of pockets of said first stiffener receives a different one of said plurality of second stiffeners and with each second stiffener extending through said first stiffener.

11. The welding assembly of claim 10, wherein a length dimension of each of said plurality of second stiffeners is orthogonal to said length dimension of said first stiffener, and wherein said length dimension of said plurality of second stiffeners corresponds with a length dimension of said outer skin.

12. The welding assembly of claim 8, wherein said first stiffener is curved proceeding along said length dimension of said first stiffener and with said length dimension of said first stiffener proceeding in said first dimension.

* * * * *